US006486256B1

(12) United States Patent
Tarbutton et al.

(10) Patent No.: US 6,486,256 B1
(45) Date of Patent: *Nov. 26, 2002

(54) COMPOSITION OF EPOXY RESIN, CHAIN EXTENDER AND POLYMERIC TOUGHENER WITH SEPARATE BASE CATALYST

(75) Inventors: Kent S. Tarbutton, Lake Elmo, MN (US); Janis Robins, St. Paul, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,597

(22) Filed: Oct. 13, 1998

(51) Int. Cl.[7] .............................. C08L 63/00; C08L 63/02
(52) U.S. Cl. ................. 525/65; 525/92 H; 525/119; 525/122; 525/407; 525/527; 525/528; 525/530; 528/93; 528/94
(58) Field of Search .................. 528/93, 94; 525/65, 525/92 H, 119, 122, 407, 527, 528, 530

(56) References Cited

U.S. PATENT DOCUMENTS

| | | | |
|---|---|---|---|
| 3,356,645 A | 12/1967 | Warren | 260/47 |
| 3,371,008 A | 2/1968 | Lopez | 161/186 |
| 3,549,592 A | 12/1970 | Godfrey et al. | 260/47 |
| 3,634,323 A | 1/1972 | Moran, Jr. et al. | 260/47 |
| 3,678,131 A | 7/1972 | Klapprott et al. | 260/837 |
| 3,792,016 A | 2/1974 | Hill et al. | 260/47 |
| 3,966,837 A | 6/1976 | Riew et al. | 260/837 |
| 4,101,514 A | 7/1978 | Thom | 528/109 |
| 4,323,453 A | 4/1982 | Zampini | 210/321.1 |
| 4,487,914 A | 12/1984 | Barton | 528/92 |
| 4,503,211 A | 3/1985 | Robbins | 528/92 |
| 4,772,645 A | 9/1988 | Tarbutton et al. | 523/457 |
| 4,833,226 A | 5/1989 | Ishimura et al. | 528/45 |
| 4,835,225 A | 5/1989 | Massingill et al. | 525/481 |
| 4,868,059 A | 9/1989 | Walker et al. | 428/416 |
| 4,880,892 A | * 11/1989 | Urano et al. | 528/94 |
| 4,980,234 A | * 12/1990 | Almer et al. | 528/97 |
| 5,001,212 A | 3/1991 | Hammer et al. | 528/94 |
| 5,115,019 A | * 5/1992 | Marx et al. | 525/65 |
| 5,138,018 A | 8/1992 | Tashiro et al. | 528/111 |
| 5,200,494 A | 4/1993 | Kubota et al. | 528/111 |
| 5,219,956 A | 6/1993 | Fukuoka | 525/526 |
| 5,248,559 A | 9/1993 | Okui et al. | 428/414 |
| 5,280,067 A | * 1/1994 | Tarbutton et al. | 525/65 |
| 5,510,428 A | 4/1996 | Harano et al. | 525/438 |
| 5,591,811 A | 1/1997 | Blyakhman | 525/504 |
| 5,629,380 A | 5/1997 | Baldwin et al. | |
| 5,712,039 A | 1/1998 | Marhevka et al. | |

FOREIGN PATENT DOCUMENTS

| | | | |
|---|---|---|---|
| EP | 92336 | * | 10/1983 |
| EP | 118270 | | 9/1984 |
| EP | 0 325 058 | | 7/1989 |
| EP | 496163 | * | 7/1992 |
| JP | 8-59796 | * | 3/1996 |

OTHER PUBLICATIONS

Riew, et al., "Rubber Toughened Thermosets," "Toughness and Brittleness of Plastics" by Deanin and Crugnola—Advances in Chemistry Series, Chapter 27, 326–343, American Chemical Society, 1976, Washington D.C.
Farkas et al., "Imidazole Catalysis in the Curing of Epoxy Resins," Journal of Applied Polymer Science, vol. 12, No. 1, pp. 159–168 (Jan. 1968).
JP 5163475—Patents Abstracts of Japan, 6/93.
3M Data Sheet, Automotive Structural Adhesives, Two–Part Induction–Cure Epoxy Adhesives 5037, 1/95.
3M Data Sheet, Automotive Structural Adhesives, 5041 Two–Part Induction–Cure Epoxy Adhesives, 1/94.
3M Data Sheet, Automotive Structural Adhesives, Two–Part Induction–Cure Epoxy Adhesives 5045.

* cited by examiner

Primary Examiner—Robert E. L. Sellers
(74) Attorney, Agent, or Firm—Harold C. Knecht, III

(57) ABSTRACT

A two-part composition useful as an adhesive comprises an epoxy resin, a chain extender selected from an amine or a phenolic compound, a base catalyst and a polymeric toughener wherein Part A contains the catalyst and Part B with the epoxy resin.

32 Claims, 3 Drawing Sheets

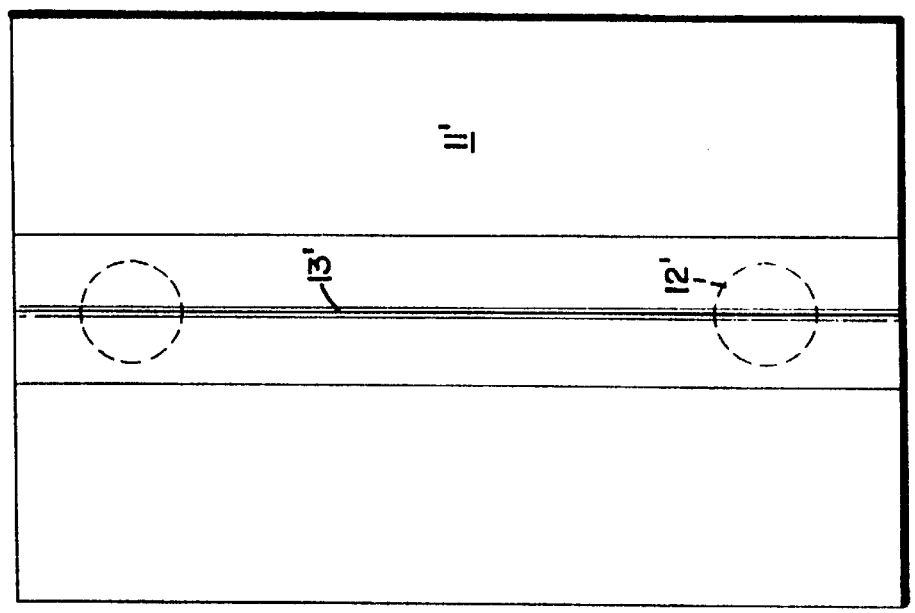
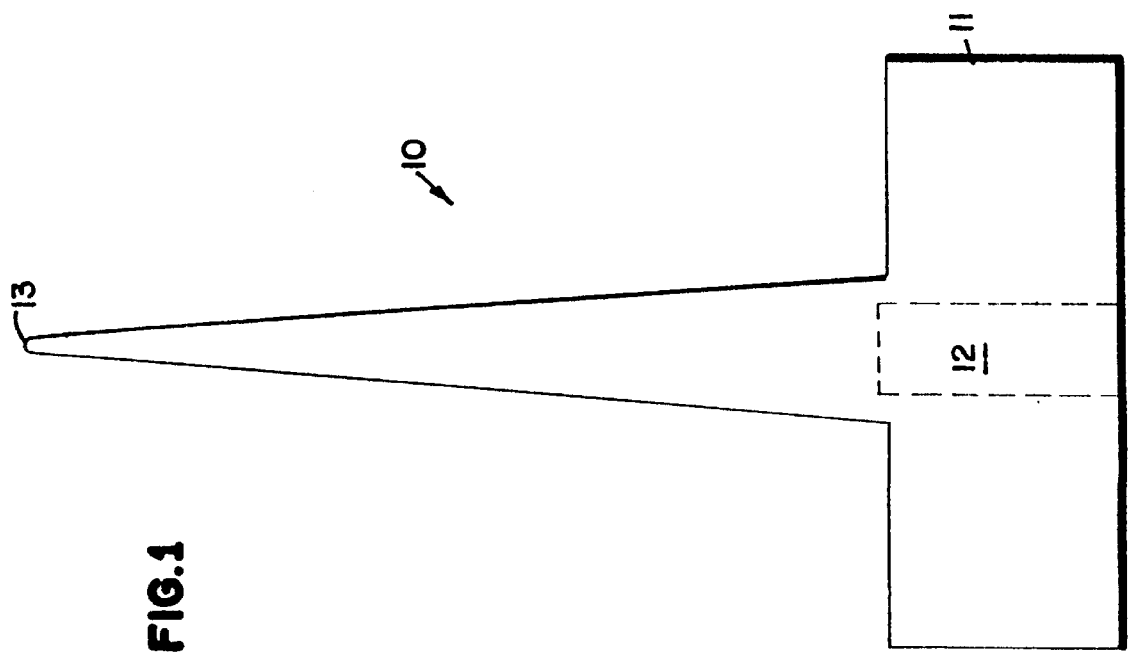

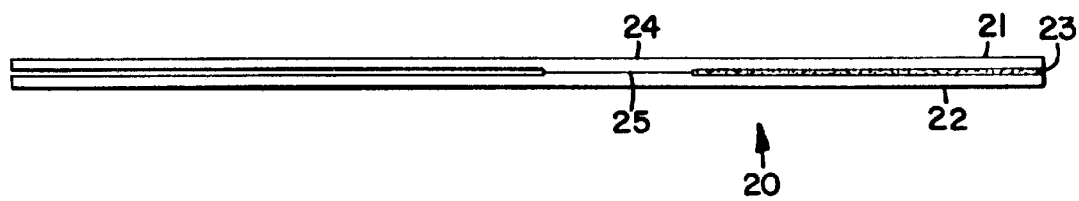
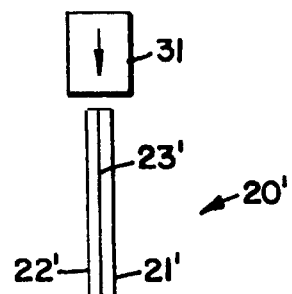
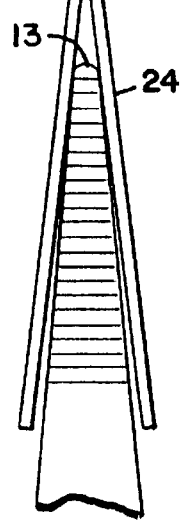
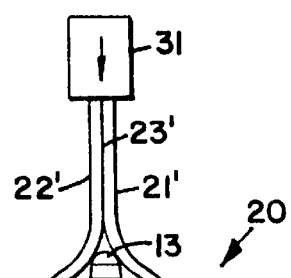
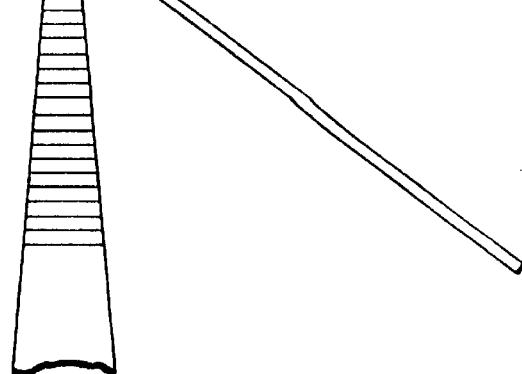

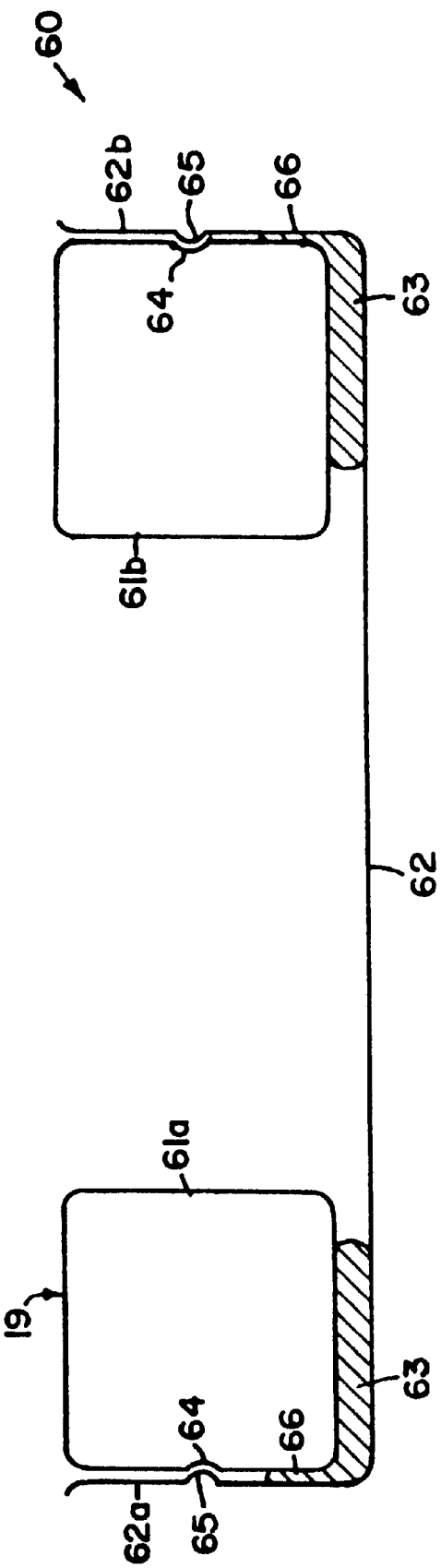

COMPOSITION OF EPOXY RESIN, CHAIN EXTENDER AND POLYMERIC TOUGHENER WITH SEPARATE BASE CATALYST

FIELD OF THE INVENTION

The invention relates to epoxy resin compositions, particularly, to an epoxy resin composition that when cured exhibits properties useful in structural assembly and, even more particularly, to two-part epoxy adhesive compositions that exhibit one or more improved adhesive properties such as impact, creep and fatigue resistance, as well as durability under service conditions for structural applications.

BACKGROUND OF THE INVENTION

Adhesives have been used in many structural applications. Such structural applications have included vehicles, computer cases, buildings, appliances, etc. For example, structural adhesives have been used in vehicle assembly (e.g., automobile and aircraft assembly) to replace or augment conventional joining techniques such as welds, nuts and bolts, and rivets.

Epoxy compositions are known and have been used for structural adhesive applications. In state-of-the-art epoxy technology today, polymerization catalysts used to achieve higher order oligomers typically are tetraalkyl ammonium or phosphonium salts that do not promote epoxy homopolymerization. Cyclic amidine catalysts, such as imidazoline catalysts and imidazole catalysts, have also been used in adhesives. The adhesives of the prior art are quality adhesives in many applications. Even so, there is a continuing need for higher performance adhesives in order to meet the changing needs of various industries such as, for example, the vehicle assembly industry.

SUMMARY OF THE INVENTION

The present invention is intended, at least in part, to address the ongoing need for higher performance adhesives to meet the needs of various industries, including the vehicle assembly industry (e.g., automobile, aircraft and watercraft industry). Compositions of the invention are believed to be useful in structural adhesive applications either alone or in conjunction with conventional assembly techniques like welding and/or mechanical fastening (e.g., rivets).

We have found a composition useful as a structural adhesive having long term durability under static and/or dynamic loads and substantially improved impact, creep and/or fatigue resistance for use in assembly applications. The composition can include a chain extender, a catalyst, a reactive epoxy resin and one or more polymeric tougheners. At least when mixed together, the present adhesive composition is in a form that can be applied or dispensed (e.g., liquid or paste form). The chain extender, the reactive epoxy resin, the catalyst and the toughener are each in an amount and of a type that are effective, when mixed together, to form a thermally curable adhesive. When the adhesive is cured, at least about 50% by weight of the epoxy resin is chain extended. Preferably, at least 60 wt %, and even more preferably at least 70 wt %, of the epoxy resin is chain extended.

It is preferred that the composition be free, or at least substantially free, of a polyfunctional curing agent (i.e., an agent that chain extends and cross links the epoxy resin). That is, the amount of polyfunctional curing agent should be limited to the point that, when the adhesive is cured, the desired amount of the epoxy resin is chain extended.

The chain extender can comprise an amine, a phenolic compound or a combination thereof. Preferably, the chain extender is all or at least substantially in monomeric form (i.e., the chain extender is not prereacted, prepolymerized or in oligomeric form) prior to being added to the composition. That is, enough of the chain extender is in monomeric form to enable the resulting composition to be applied or dispensed. Preferably, the resulting composition is compatible with state-of-the-art dispensing and rheology (e.g., viscosity) requirements. It is also preferable that the chain extender be dissolvable into the epoxy resin, the catalyst or both, at least at an elevated temperature (e.g., the curing temperature of the composition). It may be desirable for the chain extender to be in solid particulate form and finely dispersed in the epoxy resin and/or the catalyst, where the chain extender dissolves at elevated temperatures.

The phenolic compound preferably includes a dihydric phenol (e.g., a di-hydroxy benzene, such as catechol, resorcinol and/or compounds based thereon), and the amine preferably includes a primary monoamine (e.g., attached to a primary or secondary carbon), a secondary diamine, and compounds based thereon. A polyfunctional or multifunctional amine (e.g., a diamine containing both primary and secondary functionality or multiple primary functionality) will cause chain extending and cross linking (i.e., will function as a curing agent). Even though it will cause cross linking to occur, a polyfunctional amine or other curing agent may be used, but in a limited amount.

The present composition can be a two-part adhesive with the catalyst in a part A and the reactive epoxy resin in a part B. The chain extender is included in at least one of the two parts. When the chain extender of such a two-part adhesive composition includes an amine, the amine is preferably only in the part A. It may be possible to add very small amounts of amine in the epoxy part B, as long as the amount of amine is not enough to adversely affect the part B (e.g., its rheology). When the chain extender of such a two-part composition includes a catechol, the catechol can be in the part A, in the part B or in both. It is preferable that the catechol is in at least the part A. It is surprising that the catechol can be sufficiently stable (i.e., not recrystalize or react) in the epoxy resin to provide a part B with a commercially acceptable shelf life. When the chain extender includes a catechol and resorcinol, at least the part A includes the resorcinol and catechol. The part B can include the catechol without resorcinol. When the chain extender includes another type of phenolic compound, it may also be included in the part A, part B or both.

It can be preferable for at least about 50 wt % of the chain extender to be catechol. When such a chain extender also includes resorcinol, up to about 50 wt % of the chain extender can be resorcinol. It is believed that the adhesive composition can contain in the range of from about 8 wt % to about 30 wt % of such a catechol and resorcinol containing chain extender, based on the amount of chain extender and reactive epoxy.

The catalyst is preferably a base. The catalyst can include a cyclic amidine, a tertiary amine, and substituted analogues thereof The catalyst can comprise one or more of imidazole, imidazoline, a substituted imidazole compound, a substituted imidazoline compound, 1,4,5,6-tetrahydropyrimidine, a substituted 1,4,5,6-tetrahydropyrimidine compound and combinations thereof The chain extender preferably includes catechol. The catalyst can also include one or more substituted pyridines, pyrrolidines and piperidines. The chosen catalyst or catalysts should not contain a group that exhibits an electron withdrawing or stereo chemical effect sufficient to prevent the composition, when mixed together, from forming a thermally curable adhesive suitable for structural bonding. Typically, as the mass of the catalyst increases, the amount of catalyst needed to establish a desired effect also increases, unless any substitution chemistry present has an affect on (i.e., increases or decreases) the effectiveness of the catalyst. The catalyst can comprise two or more different catalysts. We have surprisingly found that a combination of two different amidine catalyst species, in particular cyclic amidine catalysts, can provide enhanced adhesive properties. A preferred combination can include one or more imidazole compounds (substituted or unsubstituted) and one or more imidazoline compounds (substituted or unsubstituted). It is believed that a combination of a 1,4,5,6-tetrahydropyrimidine compound (substituted or unsubstituted) with an imidazoline compound and/or an imidazole compound may also provide enhance adhesive properties.

Preferably, the amount of the catalyst in the adhesive composition is at a level of at least about 0.5 wt-%, more preferably, in the range of from about 0.5 wt-% to about 10 wt-% or, even more preferably, in the range of from about 0.5 wt-% to about 7.5 wt-%, based on the total amount of the reactive species or components of the adhesive mass (i.e., the chain extender, epoxy resin and catalyst) and the molecular weight of the catalyst.

The reactive epoxy resin can comprise one or more glycidyl ether epoxy compounds, each having more than one reactive epoxy group. Preferably, the reactive epoxy resin comprises at least one of an aromatic glycidyl ether epoxy compound and an aliphatic glycidyl ether epoxy compound, with at least one compound having more than one reactive epoxy group. Typically, the reactive epoxy resin materials are present in amounts in the range of from about 50 wt-% to about 90 wt-%, and preferably about 80 wt-%, based on the reactive species of the composition (i.e., catalyst, chain extender and epoxy).

It is desirable for the adhesive composition to contain up to 35 parts, preferably in the range of from about 5 parts to about 35 parts, and more preferably from about 10 parts to about 30 parts, by weight of polymeric toughener based on 100 parts by weight of the reactive epoxy resin. For a two-part adhesive composition of the present invention, the toughener can be added to the part A, the part B or both.

The present adhesives may be used to supplement or completely eliminate a weld or mechanical fastener by applying an adhesive mass between two parts to be joined and curing the adhesive to form a bonded joint. Optionally, spot welding can be used to pin the parts together until the adhesive is sufficiently cured for handling. Welding can contribute to the curing process. The adhesives may be used to form assembled structures by applying the adhesives to augment or replace welded joints and other mechanical joints. Replacing or supplementing welded joints with an adhesive bond to create a load bearing joint is believed to require superior adhesive toughness over a broad temperature range in some applications, as well as adequate adhesion to the substrates being bonded. This is related directly to the degree of polymeric matrix ductility, which requires chain extension allowing for optimum toughening. Compatibility with state-of-the-art dispensing and rheology (e.g., viscosity) requirements for a flowable one- or two-part adhesive composition can require this chain extension to occur, at least substantially if not completely, after the adhesive is applied.

For the purposes of this patent application, the term "active hydrogen" denotes a hydrogen atom in a chemical group wherein the group becomes chemically reactive with the oxirane group resulting in ring opening bonding to the group. Active hydrogens typically are found in amines, thiols, carboxylic acids and phenolics. Preferred active hydrogen groups include amine (—NH—, —NH$_2$) groups and aromatic hydroxyl (—OH) groups. The function of the active hydrogen compound is to provide chain extension. Some cross-linking can be introduced by polyfunctional amines but only to a limited extent. If excessive cross-linking occurs the adhesive can lose toughness and adhesion. Conversely excessive chain extension with little epoxy homopolymerization will result in a weak adhesive.

The first part or part A of the two-part epoxy adhesive comprises the catalyst. The second part or part B comprises the reactive epoxy portion and optional toughener. One formulation places dihydroxy phenolic in the epoxy part B with only the catalyst in a part A. A second formulation places the amine and/or dihydric phenol along with the catalyst in the part A and the epoxy and a toughener in the part B. A third formulation places a portion of the phenolic in both the part A (catalyst) and part B (epoxy).

In the adhesive of the invention, we have found that the stoichiometric equivalents ratio of reactive hydrogen sites to reactive epoxy sites is preferably less than 1.0 (i.e., for each epoxy equivalent in the adhesive, there is less than 1.0 equivalents of active hydrogen). We have also found that it can be preferable for the stoichiometric equivalents ratio to be in the range of from about 0.5 to less than 1.0, in the range of from about 0.6 to less than 1.0, or in the range of from about 0.7 to less than 1.0. The active hydrogen sites can be provided by the chain extender and catalyst. Fillers or the toughener can be independently incorporated in either or both parts A or B. We have found that an amine of the type described above can replace a portion of the dihydric phenol without a loss in physical properties and may be useful as the only chain extender in the composition. The amine can act as a diluent for the Part A, to lower its viscosity, but may also shorten the work-life of the mixed adhesive. Another function of the amine is to reduce any tendency of the phenolic to recrystallize and help stabilize the viscosity of the Part A. A further function is providing latitude in formulating for a specific volumetric mix ratio to meet dispensing requirements.

Adhesives made using the formulations of this invention can obtain an impact peel strength of at least about 3 Joules, preferably at least about 5 Joules and most preferably at least about 10 Joules at a temperature in the range of from about −40° C. to about 90° C. The desirable impact peel strength depends, at least in part, on the type of substrates being adhered together. Further, adhesives according to the present invention can form adhesive bonds having a T-peel strength of greater than about 70 N/cm width at 23° C., greater than about 85 N/cm width at 23° C., and greater than about 100 N/cm width at 23° C. The adhesive can sustain a load under certain accelerated environmental cycling conditions for at least 10 days, preferably greater than 20 days, most preferably greater than 30 days.

In another aspect of the present invention, a structure is provided that has a first surface and a second surface joined by an adhesive bond made with a cured mass of the above described adhesive composition. The structural adhesives of the invention can form high quality adhesive bonds between metallic components (e.g., iron, aluminum, titanium, magnesium, copper, etc. and alloys thereof), between non-metallic substrates (e.g., reinforced and unreinforced thermoplastic and thermoset polymers, as well as other organic materials or organic composite materials) and between metallic and non-metallic substrates. The structure being bonded can form at least a portion of a vehicle.

We have also found that adhesives used to augment or replace weld construction can provide useful properties to an assembly. Welded joints, while strong, tend to concentrate stress at the weld nugget perimeter and can fail at the weld perimeter if sufficient impact energy is applied to the joint. Additionally, corrosion resistance associated with the weld nugget and adjacent metal is typically reduced. Cured epoxy adhesives of the present invention can absorb substantial impact energy and dissipate the energy throughout the structure. Such energy dissipation properties, in conjunction with weld joints, can improve the survivability of a structure under conditions of high impact loads. Such an adhesive requires significant structural properties. Regardless of the direction of the impact energy, it may be desirable for the adhesive mass to be able to maintain structural integrity regardless of whether the adhesive is exposed to stress in a cleavage mode, a shear mode, a compression mode or a tensile mode. Therefore, the structure can comprise a joint having a welded bond in addition to the adhesive bond. In addition, the welded bond can be formed through the adhesive bond.

We have found two characteristics of adhesives that can help identify an adhesive that is useful in this type of application. We have found that the impact peel strength and T-peel adhesion of the adhesive can be useful indicators for adhesive utility. Other characteristics of adhesives useful as performance indicators can also include sustained load durability and fatigue resistance. The epoxy adhesives of the invention may be used in a structure having structural integrity that is maintained with both welded joints and adhesive bonds made using the curable adhesive of the invention or with only such adhesive bonds. Adhesives are also desirable, for example in the automotive industry, because in an effort to reduce weight, car manufacturers are looking to use thinner gauge steel either alone or in combination with aluminum, magnesium, etc. In addition, the present adhesives can be a viable option for bonding together various organic materials or composites which cannot be welded or joined with conventional methods. Additional benefits of a structure bonded according to the invention are believed to include improved crash worthiness (i.e., impact resistance), survivability, corrosion resistance, sealing of the joint and vibration damping.

In an additional aspect of the present invention, a method is provided for assembling the above described adhesively bonded structure. The method comprises the steps of: (a) applying an uncured mass of the composition of claim 1 to at least one of a first member and a second member; (b) sandwiching the uncured mass between the first member and the second member; and (c) curing the composition to form an adhesive bond so as to adhere the first member and the second member together. The first member can be a frame member and the second member can be a sheet-like member or another frame member. The method can also include the step of welding the sheet-like member to the frame member through the uncured mass before the curing step.

Adhesives can be used for such applications, but known structural adhesives that are currently available for such applications do not have the requisite combination of properties and performance over typical end use (e.g. service) temperature ranges. Such properties include long term durability and fatigue resistance under static and dynamic (e.g. cyclic) loads and good impact resistance.

BRIEF DESCRIPTION OF THE DRAWINGS

FIGS. 1–5 show the test device and test specimen used to determine impact peel strength. FIG. 1 and 2 show the test wedge used in the test. FIGS. 3–5 show the test specimen configured for the test, its installation on the wedge and the specimen after application of the test force.

FIG. 6 shows an assembly comprising a hydroformed tube structurally assembled with and adhered to a panel using the adhesive of the invention. This assembly structure includes means that maintain the structure and position during adhesive curing.

DETAILED DESCRIPTION OF VARIOUS EMBODIMENTS

The two part epoxy adhesive compositions of the present invention comprise a catalyst part A (e.g., a cyclic amidine) and an epoxy part B. Either the part A, part B or both will also contain a chain extender and a toughener. The novel compositions of the invention provide ductile and tough structural adhesives that have good long term durability and fatigue resistance under static loads and dynamic loads. The resin compositions of the invention are believed especially useful as structural adhesives where the operating temperature of the bonded article or material is expected to be substantially above and/or below room temperature, such as the range of service temperatures typically seen by a vehicle (e.g., automobiles, aircraft and watercraft). The present epoxy adhesives, when cured, are believed be useful at temperatures in the range of from about −40° C. to about 90° C. and, more desirably, from about −40° C. to about 120° C. Additionally, when used to join together parts of the frames of vehicle bodies, the adhesives can stiffen the joints and thus stiffen the vehicle's structure, as well as impart sealing and/or vibration damping properties to the vehicle bodies.

Preferred adhesive compositions of the present invention can comprise a glycidyl ether type epoxy, an amine (e.g., a primary monoamine and/or secondary diamine) and/or a dihydric phenol, a cyclic amidine catalyst, and a toughening agent, in which the epoxy and chain extender (i.e., amine and/or dihydric phenol) are substantially unreacted before the composition is exposed to a catalyst to cure the adhesive.

Another embodiment includes a two-part epoxy composition comprising a Part A or first part having a cyclic amidine catalyst, and a Part B or second part comprising an epoxy, a dihydric phenol and toughening agent wherein the epoxy and dihydric phenol are substantially unreacted, and a two-part epoxy composition comprising Part A having a cyclic amidine catalyst and catechol (i.e., 1,2-dihydroxybenezene), and a Part B comprising epoxy and toughening agent where a portion of the dihydric phenol can also be incorporated in Part B. A third embodiment comprises a Part A having a cyclic amidine catalyst, dihydric phenol and an amine (i.e., a primary monoamine and/or secondary diamine), and a Part B comprising epoxy and toughener. In all of these compositions fillers can be incorporated in both parts A and B. The amount (wt-%) of Part A and Part B can be substantially varied by the amount of filler used and the composition of each Part.

The two part epoxy adhesive compositions of the invention contain dihydric phenol. Suitable dihydric phenolic compounds of the invention include bisphenols (e.g., Bisphenol A, Bisphenol F, etc.) dihydroxynaphthalenes and dihydroxybenzenes. These dihydric phenolic compounds may be substituted or non-substituted. For example, suitable bisphenols and dihydroxybenzenes may include those that are alkyl, halogen or alkoxy substituted. Suitable dihydroxybenzenes are represented by the following formula:

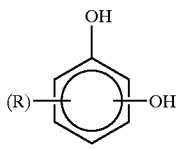

wherein the hydroxyl groups can be ortho or meta on the aromatic ring and R represents one, two or more typical substituents. In the above formula R represents any useful ring substituent including hydrogen. Included in these categories are 1,2 dihydroxybenzene (catechol), 1,2 dihydroxy-4-methyl-benzene, 4-t-butylcatechol, and 1,3-dihydroxybenzene (resorcinol), 3-methoxy-catechol and others. It is believed undesirable to have bulky substituents that can cause significant steric hindrance adjacent to the phenolic hydroxyls.

Preferred dihydric phenols include those which have hydroxyl groups attached to adjacent carbon atoms on the aromatic ring, and substituted analogues of these compounds. Preferred compounds include catechol, 3-methoxycatechol, 3-methylcatechol, 3-fluorocatechol, 4-methylcatechol and blends thereof. Preferably, the dihydric phenol is catechol, or a blend of catechol and one or more other dihydric phenols. For a blend of dihydric phenols, satisfactory results have been obtained with the catechol being present in an amount of at least about 50 percent by weight (wt-%) of the total dihydric phenol amount. We have found that these compounds are particularly useful in forming the high structural strength two part epoxy adhesives of the invention.

The epoxides that are useful in the composition of the present invention are of the glycidyl ether type. Preferred epoxides include glycidyl ethers of Bisphenol A and F; aliphatic or cycloaliphatic diols. Useful materials can include those having a molecular weight in the range of from about 170 to about 10,000, and preferably from about 200 to about 3,000. Useful materials can include linear polymeric epoxides having terminal epoxy groups (e.g., a diglycidyl ether of a polyoxyalkylene glycol. Useful epoxides can include those having the general formula:

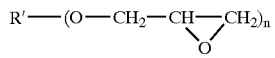

wherein: R' is alkyl, alkyl ether, or aryl, preferably aryl, and n is greater than 1 or in the range of from 1 to 4. Aromatic glydicyl ethers can be preferred, such as those prepared by reacting a dihydric phenol with an excess of epichlorohydrin. Examples of useful dihydric phenols include resorcinol, catechol, hydroquinone, and the polynuclear phenols including p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane. Examples of commercially available aromatic and aliphatic epoxides useful in the invention include diglycidyl ethers of bisphenol A (e.g., those available under the trademarks Epon 828, Epon 1001, Epon 1310 and Epon 1510 from Shell Chemical Co., and DER-331, DER-332, and DER-334 available from Dow Chemical Co.); diglycidyl ethers of bisphenol F (e.g., Epiclon TM830 available from Dainippon Ink and Chemicals, Inc.); silicone resins containing diglycidyl epoxy functionality; flame retardant epoxy resins (e.g., DER 580, a brominated bisphenol type epoxy resin available from Dow Chemical Co.); 1,4-dimethanol cyclohexyl diglycidyl ether and 1,4-butanediol diglycidyl ethers. In some cases reactive diluents may be added to control the flow characteristics of the adhesive composition. Suitable diluents can have at least one reactive terminal end portion and, preferably, a saturated or unsaturated cyclic backbone. Preferred reactive terminal ether portions include glycidyl ether. Examples of suitable diluents include the diglycidyl ether of resorcinol, diglycidyl ether of cyclohexane dimethanol, diglycidyl ether of neopentyl glycol, triglycidyl ether of trimethylolpropane. A commercially available reactive diluent is Reactive Diluent "107" from Shell Chemical Company.

The components of the composition can be present in amounts such that the stoichiometric equivalents ratio of reactive hydrogen sites to reactive epoxy sites is less than 1.0, in the range of from about 0.5 to less than 1.0, from about 0.6 to less than 1.0, and from about 0.7 to less than 1.0. The equivalents ratio is defined as the number of equivalents of reactive hydrogen sites divided by the number of equivalents of reactive epoxide sites. The active hydrogen sites can include the chain extender phenolic —OH, the chain extender amine —NH or —NH2, the catalyst amine —NH or combinations thereof We have found that the present epoxy compositions can be catalyzed with an amidine catalyst or a blend of two or more different amidine catalysts. The preferred catalysts include cyclic amidines (e.g., an imidazole, imidazoline and 1,4,5,6-tetrahydropyrimidine) and substituted analogs of cyclic amidines. An amidine is generally defined as the group —N=C—N—. Suitable ring substituents for a cyclic amidine catalyst can include a substituent such as methyl, ethyl, isopropyl, cyanoethyl, acetyl, carboxamide, methylol, etc. (e.g., for an imidazole, imidazoline or 1,4,5,6-tetrahydropyrimidine compound). The secondary nitrogen on these catalyst compounds can be further substituted as well (e.g., 1-acetylimidazole).

The preferred catalysts can include substituted imidazolines, substituted 1,4,5,6-tetrahydropyrimidines, and blends of one or both of an imidazoline and a 1,4,5,6-tetrahydropyrimidine with another amidine catalyst (e.g., imidazole or a substituted imidazole). Preferably, at least the imidazoline and the imidazole catalysts do not contain an electron withdrawing group (e.g., phenyl, nitro, carbonyl or halogen) on their respective ring. It is believed preferable for the ring of 1,4,5,6-tetrahydropyrimidine and other amidine catalysts to also be free of an electron withdrawing group. Even so, some degree of electron withdrawing can be acceptable in certain positions on the ring. Preferred substituents can include aliphatic groups in the 2-position such as the following 2-ethyl-4-methyl-imidazoline:

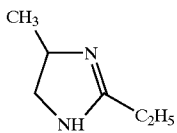

Other preferred substituents can include aliphatic groups in the 1- and 2-positions such as 1,2-dimethyl-1,4,5,6-tetrahydropyrimidine.

In the preferred practice of the invention, the amount of catalyst or blend thereof, is selected to provide a cured epoxy adhesive having unexpected properties such as sustained load durability and impact resistance, preferably over a wide range of temperatures. It has been found that the amount of catalyst used can provide the necessary balance of epoxy homopolymerization and copolymerization with amine and/or dihydric phenol (e.g., catechol) to provide the properties needed for both low and high temperature performance. The preferred amounts of catalyst can vary depending upon the catalyst type and active hydrogen/epoxy ratio (NH,OH/Epoxy ratio). The useful range needs to be high enough to effect both the epoxy copolymerization and homopolymerization reaction. A level of catalyst too low or too high will result in a weak adhesive leading to poor performance. The optimum amount of catalyst can also vary with the catalyst chemistry.

For a preferred catalyst chemistry in the case of: 2-ethyl-4-methylimidazoline the range can be from about 1.0% to about 8.0% by weight (wt-%) based on the weight of epoxy, chain extender (i.e., amine and/or catechol) and catalyst, and preferably from about 2 wt-% to about 7.0 wt-%; 2-benzyl-2-imidazoline the range can be from about 3.0 wt-% to about 11.0 wt-% and preferably from about 4.0 wt-% to about 10.0 wt-%; 4,4'-dimethyl-2-imidazoline the range can be from about 3.0 wt-% to about 7.0 wt-% and preferably from about 4.0 wt-% to about 6.0 wt-%. Other preferred catalysts can include: imidazole in the range of from about 0.25 wt-% to about 3.0 wt-% and preferably from about 0.5 wt-% to about 2.25 wt-%; DBUE (1,4-Diazabicyclo<5.4.0>undec-7-ene) in the range of from about 4.0 wt-% to about 8.0 wt-% and preferably from about 5.0 wt-% to about 7.0 wt-%; I-butylpyrrolidine in the range of from about 3.0 wt-% to about 7.0 wt-%; 1,4,5,6-tetrahydropyrimidine in the range of from about 3.0 wt % to about 8.5 wt %; 1,2-dimethyl-1,4,5,6-tetrahydropyrimidine in the range of from about 1.5 wt-% to about 6.0 wt-%; and N,N-dimethylbenzylamine in the range of from about 4.0 wt-% to about 8.0 wt-%.

Toughening agents (or elastomeric modifiers) for use in preferred compositions of the present invention generally comprise: polymeric compounds having both a rubbery phase and a thermoplastic phase such as graft copolymers having a polymerized diene rubbery core and a polyacrylate or polymethacrylate shell; graft copolymers having a rubbery core with a polyacrylate or polymethacrylate shell; and elastomeric particles polymerized in situ in the epoxide from free-radical polymerizable monomers and a copolymeric stabilizer; elastomer molecules, separate elastomer precursor molecules; combination molecules that include epoxy-resin segments and elastomeric segments; and, mixtures of such separate and combination molecules. These materials are used to improve structural properties including peel strength. The combination molecules may be prepared by reacting epoxy resin materials with elastomeric segments; the reaction leaving reactive functional groups, such as unreacted epoxy groups, on the reaction product. The general use of tougheners in epoxy resins is well-known, and is described in the Advances in Chemistry Series No. 208 entitled "Rubbery-Modified Thermoset Resins", edited by C. K. Riew and J. K. Gillham, American Chemical Society, Washington, 1984, the reference being incorporated herein by reference. The amount of toughening agent to be used depends in part upon the final physical characteristics of the cured resin desired, and is generally determined empirically.

Specific examples of useful toughening agents include graft copolymers having a polymerized diene rubbery backbone or core to which is grafted a shell of an acrylic acid ester or methacrylic acid ester, monovinyl aromatic hydrocarbon, or a mixture thereof such as disclosed in U.S. Pat. No. 3,496,250, incorporated herein by reference. Preferable rubbery backbones can comprise polymerized butadiene or a polymerized mixture of butadiene and styrene. Preferable shells comprising polymerized methacrylic acid esters can be lower alkyl ($C_{1-4}$) substituted methacrylates. Preferable monovinyl aromatic hydrocarbons can be styrene, alpha-methylstyrene, vinyltoluene, vinylxylene, ethylvinylbenzene, isopropylstyrene, chlorostyrene, dichlorostyrene, and ethylchlorostyrene.

Further examples of useful toughening agents are acrylate core-shell graft copolymers wherein the core or backbone is a polyacrylate polymer having a glass transition temperature T(g) below about 0° C., such as polybutyl acrylate or polyisooctyl acrylate to which is grafted a polymethacrylate polymer (shell) having a T(g) about 25° C. such as polymethylmethacrylate.

Still further examples of toughening agents useful in the invention are elastomeric particles that have a T(g) below about 25° C. and have been polymerized in situ in the epoxide before mixing with the other components of the composition. These elastomeric particles are polymerized from free-radical polymerizable monomers and a copolymerizable polymeric stabilizer that is soluble in the epoxide. The free-radical polymerizable monomers are ethylenically unsaturated monomers or diisocyanates combined with coreactive difunctional hydrogen compounds such as diols, diamines, and alkanolamines. Examples of these elastomeric particles are disclosed in U.S. Pat. No. 4,525,181, which is incorporated herein by reference. These particles are commonly referred to as "organosols".

Still other toughening agents are rubber modified liquid epoxy resins. An example of such a resin is Kraton™ RP6565 Rubber available from Shell Chemical Company. The modified epoxy resin is made from 85% by weight Epon™ 828 and 15% by weight of a Kraton™ rubber. The Kraton™ rubbers are known in the industry as elastomeric block copolymers.

The toughening agent is preferably used in an amount up to about 35 parts by weight per 100 parts of epoxy resin. Above 35 parts of toughening agent, the composition can become very viscous and may require a preheating or prewarming to facilitate its dispensing. The toughening agents of the present invention add toughness to the composition after curing. Some toughening agents can react and others will not react with the epoxide.

Other useful toughening agents include: carboxylated and amine terminated acrylonitrile/butadiene vulcanizable elastomer precursors such as Hycar® CTBN 1300X8 and ATBN 1300X16 and Hycar® 1072 from B. F. Goodrich Chemical Co.; butadiene polymer such as Hycar® CTB; amine functional polyethers such as HC1101 (i.e., polytetramethylene oxide diamine) a 10,000 MW, primary amine-terminated, compound from Minnesota Mining and Manufacturing Co.; St. Paul, Minn., and Jeffamine® from Huntsman Chemical Co. in Houston, Tex.; functional acrylic rubbers including acrylic core/shell material, such as Acryloid®KM330 and 334 from Rohm & Haas; and core/shell polymers, such as methacrylate-butadiene-styrene (MBS) copolymer wherein the core is crosslinked styrene/butadiene rubber and the shell is polymethylacrylate (e.g., Acryloid® KM653 and KM680; Rohm and Haas). As used above, for acrylic core/shell materials "core" will be understood to be acrylic polymer having Tg<0° C. and "shell" will be understood to be an acrylic polymer having Tg>25° C. Tougheners may include epoxy-terminated compounds, which can be incorporated into the polymer backbone. A typical, preferred, list of tougheners includes: acrylic core/shell polymers; styrene-butadiene/methacrylate core/shell polymers; polyether polymers; carboxylated acrylonitrile/butadienes; and, carboxylated butadienes. Advantages can be obtained from the provision of the chain extension agent in a composition with an epoxy resin even in the absence of a toughening agent as described above. However, particular advantage is achieved from the presence of the toughening agent or combinations of different agents, as previously suggested. It is a feature of the present invention that improved resins as disclosed herein are generally made particularly susceptible to, or are enhanced with respect to, the beneficial effects of tougheners.

When included in the epoxy adhesives of the invention, typically in Part A (the catalyst part) the amine or amines used are able to achieve chain extension of the growing polymeric chain during curing. Preferred amines can have a reactive or active hydrogen functionality of two. Such useful amines include normally liquid amines compatible in part A alone or in combination with the catechol used in the adhesive of this invention. Useful amines include aliphatic primary monoamines, secondary diamines and other amines having two reactive hydrogens per molecule. Such amines can have other reactive hydrogens if they are sterically or otherwise hindered and are substantially non-reactive during curing. Preferred amines are substantially free of electron withdrawing groups in a position that reduces reactivity of active hydrogens in the amine. Suitable amines can include polyether monoamines, amido mono- and di-amines, aliphatic primary monoamines, polyether diamines with secondary nitrogen groups, diamines with secondary nitrogen groups, monoalkanolamine, etc. Preferred amine compounds can include compounds of the formula:

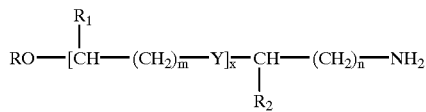

wherein R, R$_1$ and R$_2$ are independently selected from the group consisting of aliphatic, aryl (aromatic) or hydrogen; wherein n and m are numbers independently selected from 0 to 3; x is a number that ranges from 0 to 10; and Y can be —O— or —S—. In another amine, possibly useful in limited amounts, Y is —NH—.

An additional embodiment of the chain extender amines are compounds according to the formula:

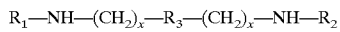

wherein R$_1$ and R$_2$ are independently selected from the group consisting of alkyl, benzyl, —CH$_2$—CH$_2$—CN; R$_3$ is independently selected from the group consisting of —CH$_2$—, —S—, —O—CH$_2$—CH$_2$—O—, or arylene structures including phenylene or naphthalene and each x is independently a number that ranges from 1 to 3. In another amine, possibly useful in limited amounts, R$_3$ is —NH—.

A third embodiment of the chain extender amine compounds are compounds of the formula:

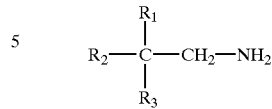

wherein R$_2$ is an aliphatic group or an aromatic group, containing 1 to 18 carbon atoms and R$_1$ and R$_3$ are R$_2$ or H.

One specific embodiment of the chain extender amine of the present invention comprises alkyl amino substituted morpholine (e.g., 4-(3-aminopropyl)morpholine). Another amine, possibly useful in limited amounts, may be an alkyl amino substituted piperazine. Each of these amines has the following formula:

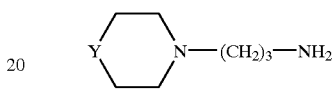

wherein Y is —O— for the alkyl amino substituted morpholine and Y is —NH— for the alkyl amino substituted piperazine.

It can be desirable for the above amines to be used in the adhesive at amounts in the range of from about 0.5 wt-% to about 20 wt-%, preferable from about 2 wt-% to about 15 wt-%, based on all of the reactive components (i.e., the epoxy resin, catalyst and chain extender). When catechol and an amine are used together, it can be desirable for the catechol/amine weight ratio to be in the range of from about 4 to about 0.5 parts of catechol per 1 part by weight of amine, and preferable at least about 1 part catechol per 1 part by weight of amine.

It has been found that the risk of the catechol recrystallizing can be effectively eliminated, or at least significantly reduced, by adding some resorcinol and/or amine as part of the chain extender. The use of a liquid amine can help to prevent recrystallization of the catechol, when the catechol is mixed with the amine, depending on the solubility of the catechol in the amine. The use of a liquid catalyst may also help to prevent recrystallization of the catechol, when the catechol is mixed with the catalyst, depending on the solubility of the catechol in the catalyst. Preferably, the catechol is soluble in both the catalyst and the amine, when an amine is used. Furthermore, it has been found that the addition of an amine can provide faster reactivity (i.e., shorter curing times) and greater latitude in the mix ratio between parts A and B. By adding an amine in the chain extender, the adhesive composition can gel more quickly to a tack free state. How quickly the composition gels depends on the amount and type of amine used. If the amine concentration is too high, it may impact performance of the adhesive composition.

Various adjuvants may be added to compositions according to the present invention, to alter the characteristics of the cured composition. Included among useful adjuvants are: corrosion inhibitors such as some silica gels; thixotropic agents such as fumed silica; pigments such as ferric oxide, brick dust, carbon black, and titanium oxide; reinforcing agents such as silica, magnesium sulfate, calcium sulfate, and beryllium aluminum silicate; clays such as bentonite; and any suitable filler. Amounts of up to about 50 parts of adjuvant, and possibly more, per 100 parts of liquid adhesive components may be effectively utilized. Generally, the toughening agent is pre-dispersed in the epoxide compound.

The toughener-containing epoxide part B is then mixed with a curative part A, with the chain extension agent in the part A, the part B or both parts, to form a substantially uniform mixture.

The mixture is cured upon heating for an appropriate length of time. While partial curing reaction may take place slowly at room temperature, full cure is preferably brought about by heating the mixture to a temperature in the range of from about 130° C. to about 200° C. for an appropriate length of time. A typical heating cycle may be 20 minutes at 163° C. Generally, as the curing temperature increases, the curing time decreases.

The adhesives of the invention may be used, for example, to assemble panels or other sheet-like structures with frame members. As shown in FIG. 6, the adhesive may be used in combining a panel with a hydroformed tube frame structure using self-positioning means to hold the parts in a correct alignment while the adhesive cures. Such an assembly system is a substantial advancement over other systems. In addition, the adhesive may be useful in bonding together members of a space frame. Furthermore, the adhesive may be used, for example, in an automobile to bond weld paddles onto an intrusion beam in order to make a door intrusion beam assembly. The adhesive may also be used to adhesively bond the door intrusion beam assembly in the automobile door. Welding (e.g., tack welding) or mechanical fastening could be used to fix the adhesively bonded paddles in place until the adhesive cures. It may also be desirable to use the adhesive to bond hydroformed tube steel together in order to make an automobile space frame assembly. Another use for the adhesives of the invention involves hem bonding of two substrates with an appropriate mechanical structure. In hem bonding, an adhesive mass is formed between the edges of two substrates brought into close alignment. The edges of the substrates are bent in an overlapping fashion to form a folded or bent edge structure with the adhesive found between the substrates throughout the folded or overlapped edge. The thus formed edge structure can then be cured through induction heating or other common heat curing methods (e.g., infrared radiation, forced air, immerson, etc.).

In areas of adhesive bonding, the adhesive can be applied as a continuous bead, in intermediate dots, stripes, diagonals or any other geometrical form that will conform to forming a useful bond. Such adhesive placement options can be augmented by welding. The welding can occur as spot welds, as continuous seam welds, or as any other welding technology that can cooperate with an adhesive mass to form a mechanically sound joint that has adequate fatigue and impact resistance and load bearing performance. Such welding can occur around or through the adhesive bonds. The heat of welding can augment other curing energy inputs (e.g., oven baking, induction heating, etc.).

The specification provides an explanation of the components and processing used to make and use the epoxy compositions of the invention. The following examples and data further exemplify the invention and demonstrate the advance in structural adhesives achieved by this invention.

Preparation of Substrates
FPL Etched Aluminum Substrate

The aluminum substrate is a 102 mm by 178 mm by 0.8 mm thick sheet of 2024T-3 Alclad aluminum obtained from Alcan Corporation. Each sheet or coupon is treated as follows before testing: 1) soaking for 10 minutes in Oakite™165 caustic wash solution, obtained from Oakite Corp., St. Paul, Minn., at a temperature of 85° C.; 2) the sheets (in a rack) are submerged in tank of tap water for 10 minutes; 3) spray rinsing with tap water for 2–3 minutes; 4) soaking in a tank of FPL etch (a hot solution of sulfuric acid and sodium dichromate from Forest Products Laboratory of Madison, Wis.) at 66° C. for 10 minutes; 5) spray rinsing with tap water for 2–3 minutes; 6) drip drying for 10 minutes at ambient temperature and then for 30 minutes in a re-circulating air oven at 54° C.; 7) spraying a primer (EC3960 available from 3M Company, St. Paul, Minn.) to a coating thickness of 0.25 to 0.50 mm; 8) drying at ambient temperature (about 23° C.) for 30 minutes followed by drying in a re-circulating air oven at about 121° C. for one hour.

Steel Substrate

The steel substrate is a 25 mm by 100 mm by 0.8 mm thick coupon of hot dipped minimum spangled galvanized steel (G60HDMS obtained from National Steel Corporation, Livonia, Mich.) unless otherwise noted. The steel is cleaned by applying methyl ethyl ketone (MEK) to the surfaces, wiping with cheesecloth, and then drying for about 10 minutes at room temperature.

Lubricated Steel Substrate

A lubricated steel substrate is prepared by taking the steel coupon described above that has been cleaned with methyl ethyl ketone and then applying a controlled coating weight of 61MAL automotive lubricant obtained from Quaker Corp., Chicago Ill., unless otherwise noted. The lubricant is applied with an Eppendorf® Repeater™ Pipette #4780 with a 1 microliter tip. A setting of #4 on the pipette dial was used to dispense 3 drops of lubricant (i.e., 12 microliters) onto the cleaned steel surface, and then smeared to an even coating with a latex gloved finger. The coating weight is measured to be about 400±50 milligrams per square foot (about 4.3±.54 g/m$^2$).

TEST METHODS

Test Method A
T-Peel Adhesion Test on An FPL Etched Aluminum Substrate

The aluminum sheet substrate is prepared as described above for FPL Etched Aluminum. The test adhesive is applied over the entire primed surface. Glass fibers (diameter 0.13 mm) are then laid across the adhesive at a 45 degree angle at a density of about one fiber every 25.4 mm. A second prepared aluminum test substrate is placed over the first one at a 12.7 mm offset in the lengthwise dimension to facilitate opening of the bond for a T-peel configuration and with the prepared surface against the adhesive. The sample is then placed between two 203 mm by 203 mm by 6.4 mm thick steel plates, put into a press applying 27.6 kiloPascals (kPa), and cured at about 121° C. for 60 minutes. The laminate is then allowed to equilibrate at 23° C. and 50% relative humidity (RH) for 24 hours. Test samples measuring 25.4 mm by about 178 mm test sample are cut from the sheet and tested for T-peel on an Instron Tensile Tester following ASTM D1876-72 at a crosshead speed of 127 mm-min$^{-1}$. Results are reported in Newtons per centimeter (N-cm$^{-1}$)

Test Method B
T-Peel Adhesive Strength on Steel or Lubricated Steel Substrate

The test adhesive is spread over the prepared surface of two steel or lubricated steel coupons described above except for a 15–20 mm section left free of adhesive on the opposite ends of each test strip. The adhesive contains solid glass beads having a diameter of 0.25 mm ±0.01 mm, obtained from Cataphote, Inc., Jackson, Miss. The beads are used to control bondline thickness and the adhesive is spread with a spatula by applying pressure so that the spatula is contacting the glass beads. The two strips are brought together, and clamped with two medium sized binder clips along each of the 100 mm edges. The coupons remain clamped together and are placed in a forced air oven at 163° C. for 20 minutes to cure the adhesive and form a coupon assembly. The non-adhesively bonded ends of the coupon assembly are each then pried open to form a T-shaped configuration at either end of the coupon assembly. The coupon assembly is then allowed to equilibrate at room temperature. The T-peel strength is performed according to ASTM Method D 1876-72 using an Instron Tensile Tester at a crosshead speed of 127 mm-min$^{-1}$. Results are reported in Newtons per centimeter (N-cm$^{-1}$).

Test Method C
Overlap Shear Test for Aluminum Substrate

Test sheets of aluminum are prepared as described for the T-peel test. The test adhesive is applied over about 12.2 mm of a primed sheet of aluminum. Glass fibers are applied at a 45 degree angle as described above. The primed surface of a second sheet of aluminum is pressed into the adhesive such that the second sheet overlaps the adhesive 12.7 mm with the non-adhesive portions of each of the sheets extending in opposite directions. The sample is cured between steel plates as described above, and then conditioned at 23° C. and 50% RH for at least 24 hours. Test samples measuring 25.43 mm in width are cut from the cured sample. Overlap shear strength is determined on an Instron Tensile Tester following ASTM TM D1002-72 at a crosshead speed of 50 mm per min.

Test Method D
Overlap Shear Strength on Cleaned Steel or Lubricated Steel

The test adhesive is applied over 12.72 mm on one end of two 25 mm by 100 mm cleaned steel or lubricated steel coupons and spread down to the level of glass bead particles contained within the adhesive, as described above for Test Method B. The two adhesive coated ends are pressed together forming a 12.72 mm overlap with the non-adhesive ends of the coupons extending in opposite directions. The overlapped coupons are clamped together at the adhesive ends using a 0.94 cm capacity binder clip (No. 1002 available from IDL MFG and Sales Corp., Carlstadt, N.J.). The clamped assembly is then cured in a forced air oven at 163° C. for 20 minutes. The laminate is then allowed to equilibrate at room temperature. Overlap shear strength is determined according to ASTM D1002-72 with an Instron Tensile Tester at a crosshead speed of 50 mm per minute. Test results are reported in megaPascals (MPa).

Test Method E
Inpact Peel Test (Dynamic Wedge Impact)

This test is used to evaluate the relative ability of an adhesive bonding system to dissipate energy in the peel mode during an impact load. The method is a Ford Laboratory Test Method and is an extension to ISO Method 11343 with the same specimen size and wedge shape as the ISO method.

The wedge shape is shown in FIGS. 1 and 2. It measures 117.3 mm in height and 20 mm at the base with a radius of 1.0 mm at the tip for an angle of 8.8°, and is fabricated from hardened steel. The impact portion of the test transducer (hammer) is fabricated from hardened steel and measures at least 25 mm by 5 mm in thickness to insure impact over the entire top of the test assembly. In FIG. 1, the test wedge shaped 10 is shown having a base 11 secured using drilled and tapped mounting napatures 12 and the wedge 13. In FIG. 2, a top view of the wedge showed in side view in FIG. 1 is shown having the wedge 13', the base 11' and the tapped and drilled holes 12'.

The test is performed using an instrumented impact testing machine called a Dynatup Impact Test Machine, Model 8250 made by Instron Corp. (formerly General Research Corp.) of Canton, Mass. The impact hammer is a force transducer classified as a drop weight "tup".

The test substrates used are MEK (methyl ethyl ketone) cleaned G60 hot-dipped minimum spangled galvanized metal coupons (obtained from National Steel Corp.) measuring 20 mm×90 mm×0.78 mm with tolerance on length and width being ±0.1 mm. Test specimens are prepared by first aligning two metal coupons so that their 90 mm sides are touching. Then 19 mm wide Kapton tape (3M Company tape #5419) is applied to a distance of 30±0.2 mm from the ends of both coupons across both coupons. The test adhesive is applied to the 30 mm exposed surface at the ends of both coupons, as described above for Test Method B. Any adhesive on the Kapton tape surface is removed. Both coupons are pressed together—adhesive to adhesive—and excess adhesive that has squeezed beyond the edges is removed. The test assembly is then clamped with medium size binder clips followed by curing at 163° C. for 20 minutes. The cured test assembly is then allowed to equilibrate at room temperature prior to testing. FIG. 4 shows the appropriate configuration with the coupons 21 and 22 having the test adhesive mass 23 adhering the coupons.

The test assembly and wedge are maintained at a constant temperature specified for the test (23° C. or 90° C., both ±1° C.). The assembly is marked 40.0±0.2 mm from the bonded end for consistent placement on the wedge. The nonbonded end of the assembly is then slipped over the wedge 10 and pushed down until reaching the 40 mm mark. The assembly is not prebent, but allowed to conform to the shape of the wedge. FIG. 4 shows the appropriate configuration with the coupons 21 and 22 with the test adhesive mass 23 adhering the coupons. The assembly is positioned on the wedge knife edge so that it is square with respect to the wedge and impact hammer and that the hammer hits the entire top of the test assembly simultaneously. The test machine is activated by impacting the specimen with a falling weight 31 of 44.8 kg at 2 meters-sec$^{-1}$. FIG. 5 shows the specimen of FIG. 4 after the application of the force. Test results are reported as Crack Propagation Load in KiloNewtons (kN) and the measured Energy in Joules (J) required to split apart the assembly. Test temperatures are reported as +23° C. and 90° C.

Test Method F
Sustained Load Durabilty (SLD)

This test is used to evaluate the relative durability of an adhesive bond when exposed simultaneously to a tensile load and environmental aging. The test substrate is a 25 mm by 76 mm steel coupon (G60HD steel available from National Steel, unless otherwise indicated) that has been lubricated with 61 MAL lubricant at a coating weight of 4.3 grams per square meter (400 miligrams/ft$^2$). The sample is prepared as for the overlap shear test. The adhesive, containing 0.25 mm diameter glass beads to control the bond line thickness, is applied to a 1.27 cm long area on the oiled side of one coupon. A second oiled coupon is placed over the adhesive and the sample is clamped. The sample measures 14 cm in length with an overlap adhesive bond measuring 1.27 cm in the middle. Excess adhesive that squeezes out of the edges is removed prior to curing. The sample is cured in an oven at 163° C. for 20 minutes. The sample is then allowed to equilibrate at room temperature before testing.

Each end of the sample is punched with a 6.35 mm hole that is centered 1.27 cm in from each end. For a single test, five samples are arranged and bolted end to end in alternating fashion so that the bondlines are aligned along the center of the test fixture. Stainless steel bolts (6.35 mm dia. by 19.05 mm long) with corresponding nuts and nylon washers having a 19.05 mm diameter were used to bolt the samples together to form a string of five samples.

The test fixture is a stainless steel U-channel measuring 63.5 cm long by 5.1 cm wide by 2.5 cm high. The walls of the U-channel are 0.3 cm thick. The U channel has a spring attached to one end and a fixed end block attached to the other end. The fixed end block is a 5.7 cm by 4.3 cm steel block having a 3 cm by 4.3 cm by 1 cm thick block cut out of one end to form a step in the block. The stepped end block fits into the channel with the stepped portion facing the inside length of the channel. The end block is bolted to one end of the U-channel and a bolt affixed at the center of the stepped portion of the end block is used to attach the test samples. The other end of the U-channel has a fixed end cap with a 24 mm by 1.2 cm diameter threaded rod extending through it. Within the channel, the rod is attached to an end block similar to the one on the opposite end except that this end block is free to move as the threaded rod is turned. A 304 coiled stainless steel spring having an I.D. of about 2.5 cm, a length of 9.7 cm, and a spring rate of approximately 15 kg-mm$^{-1}$ (available from Century Spring Corp., Los Angeles, Calif.—part # is RV-43190), with fitted endcaps and washers on each end of it, is placed over the threaded rod. A hex nut is placed over the threaded rod to hold the spring in place. A hollowed out cylinder having an inside diameter that is slightly larger than the outer spring diameter is placed over the spring to prevent lateral deflection of the spring. The amount of deflection in the spring equal to 226.8 kilograms was determined by compressing the spring on an Instron 4210 compression tester to that weight and measuring the compressed length of the spring. The compressed length was approximately 85% of its original length.

For the test, the string of samples is bolted to each of the end blocks inside of the U-channel and the spring is compressed to the calibrated compression length to yield a tensile stress of 7 MPa. The rack of samples under a tensile stress are aged in the test cycle below. One day represents one cycle (i.e., 24 hours). The test is typically started on a Monday morning, and five cycles are run during the week (i.e., five days a week). The rack is left in the controlled environment cabinet over the weekend with no immersion in the salt solution. Weekend days are not counted as cycles. Test results are reported in cycles. The steps of each cycle are as follows:

1. The rack is first immersed in a salt solution (5% by weight sodium chloride in distilled or deionized water) at 23±2° C. for 15 minutes.
2. The rack is then removed from salt solution and allowed to drip dry vertically at 23±2° C. for 105 minutes.
3. The rack is next placed in a controlled environment cabinet at 50±2° C. and 90±5% relative humidity for 22 hours. The rack is checked daily for failure. If one of the lap shear samples in a rack fails, the sample is removed and a spacer is bolted in its place to maintain the appropriate stress.
4. Cycling is continued until three bonds have failed, noting the cycles to failure for each bond. The number of cycles to failure for the three bonds is averaged and then recorded.

Test Method G

Fatigue Test

This test is a measure of cyclic fatigue resistance as measured by the total number of cycles that an adhesive bond endures and the amount of crack propagation in the bond. Test samples are prepared as for Test Method B (T-peel Adhesion) described above except that the coupons are bent 90 degrees to form a 2.5 cm tab where the bend radius is half of the metal thickness. The coupons are 0.7 mm thick 70G70GE draw quality electro-galvanized steel from National Steel. The bent coupons are degreased as described above in steps 1), 2), 3) and 6) of the FPL Etched Aluminum substrate. Coupons are drip-dried for 10 minutes at ambient temperature, then placed in a recirculating air oven at 54° C. for 30 minutes to dry. The dried coupons are placed in a sealed polyethylene bag and stored in a dessicator until the bonds are made.

Prior to application of the adhesive, a 2.5 cm wide strip of 5419 Kapton Tape available from 3M Company, St. Paul Minn., is applied across the end of the tab on the adhesive side of each coupon so that the tab is essentially covered by the tape. The adhesive is then applied, as described above for Test Method B, to the untaped surface of the taped side of each coupon up to the edge of the tape. The adhesive coated surfaces of two such coupons are brought together and clamped with two medium sized binder clips along each edge of the coupons. Excess adhesive that squeezes out is removed. The clamped assembly is then placed in a forced air oven set at 163° C. for 20 minutes to cure the adhesive. The tape is not removed from the tabs. The test assembly is allowed to equilibrate at room temperature prior to testing.

The test is conducted on an MTS 880 tensile testing machine set in a constant load mode for a 20 Hertz sinusoidal cycle with ±222.4 Newtons force for maximum load and 22.2 Newtons for minimum load. The tabbed (i.e., taped) ends of the bond assembly are inserted into the grips and the grip edges are positioned equidistant from the center of the bondline. The test assembly is preloaded to a 0.055 mm displacement prior to initiating cycling. Automatic termination of the cycling would occur if vertical displacement exceeded 6.35 mm. The adhesive of Example 172 exhibited 3,391,000 cycles at which time the test was manually terminated with negligible crack propagation (less than 1 mm).

IDENTIFICATION OF COMPONENTS USED IN THE EXAMPLES

Epon™828 Epoxy Resin—diglycidyl ether of Bisphenol A having an epoxy equivalent weight of about 190 and an average molecular weight of 350–400, and available from Shell Chemical Company.

Epon™ 58006 resin (Toughener)—Epoxy resin adduct having 40% by weight Hycar 1300X8 and 60% by weight Epon 828 available from Shell Chemical Company Paraloid™BTA IIIF copolymer (Toughener)—methyl methacrylate/butadiene/styrene copolymer available from Rohm & Haas Company.

PARALOID™ EXL2600 (Toughener)—Methacrylate/butadiene/styrene core-shell polymer available from Rohm & Haas.

MK107 Reactive Diluent—diglycidyl ether of cyclohexane dimethanol available from Shell Chemical Company.

GP-71 silica—silicon dioxide having a particle size in the range of from about 20 to about 30 micrometers, available from Harbison-Walker Corp.

Cab-0-Sil™TS-720 silica—fumed silica available from Cabot Corp.

"B37/2000" glass bubbles—glass bubbles available from Minnesota Mining & Manufacturing Company.

Glass Beads—solid glass beads having a diameter of 0.25 mm ±0.01 mm, obtained from Cataphote, Inc., Jackson Miss.

Other chemical compounds used can be obtained from chemical supply companies such as Aldrich Chemicals.

Examples 1–20

A first epoxy resin premix composition (Premix I) was prepared by mixing 500 grams of Epon™828 epoxy resin with 125 grams of Paraloid™EXL2600 copolymer using a high shear mixer between 110–120° C. for about 30 minutes, and then cooling to ambient temperature. A second epoxy resin premix composition (Premix II) was prepared by combining 243 grams of Epon™828 epoxy resin with 130 grams of catechol in a glass jar, flushing with nitrogen, and heating at 121° C. for 15 minutes with occasional stirring until a clear homogeneous (i.e., no apparent phase separation or recrystallization) solution was formed. The mixture was cooled to ambient temperature. Part B of an epoxy resin composition was prepared by mixing 335 grams of Premix I, 339 grams of Premix II, 65 grams of MK107 reactive diluent, 201 grams of GP-71 silica, 30 grams of K37 glass bubbles, 17 grams of Cab-O-Sil™TS-720 silica, and 12 grams of glass beads in a planetary mixer under vacuum for about 20 minutes. The resulting composition had a smooth paste-like consistency.

Two-part epoxy adhesive compositions were prepared by mixing varying amounts of Part A (catalyst only) shown in Table 1 and 5.0 grams of Part B. The amounts of catalyst are shown as a percent of the total formulation (%T), by weight in grams (Part A—grams) and also as a percent of the reactive species (% Cat), i.e., the amounts of epoxy, catechol, and amine from the catalyst. The catalyst used for Examples 1–7 was 2-ethyl4-methylimidazoline; the catalyst for Examples 8–14 was 2-benzyl-2-imidazoline; the catalyst for Examples 15–20 was 4,4-dimethyl-2-imidazoline. The active hydrogen to epoxy molar ratio for these examples (i.e., OH-Amine/Epoxy ratio) was maintained at about 0.8 for each of these examples. In calculating this ratio, any aliphatic hydroxyls present in an exemplary amine (e.g., 3-amino-1-propanol) were not considered. The "OH" referred to in the OH-Amine/Epoxy ratio refers to a phenolic OH (i.e., from the phenolic chain extender), and the "Amine" refers to any $NH_2$ and/or NH from the amine chain extender and catalyst.

The adhesives were tested for Impact Peel Resistance, as measured by crack propagation load in kiloNewtons (kN) and total energy in Joules (J) at 23° C. and 90° C. according to the test described above. The adhesives were also tested for T-peel adhesion at 23° C. on the above described steel substrate. Test results are shown in Table 1.

TABLE 1

| Ex | % T | Part A grams | % Cat | Energy (J) @23° C. | Load (kN) @23° C. | Energy (J) @90° C. | Load (kN) @90° C. | T-Peel N-cm$^{-1}$ @23° C. |
|---|---|---|---|---|---|---|---|---|
| 1 | 1 | 0.05 | 1.47 | NT | NT | NT | NT | 0 |
| 2 | 2 | 0.10 | 2.88 | 2 | 0.1 | 27 | 0.8 | 2 |
| 3 | 3 | 0.15 | 4.27 | 15 | 0.4 | 22 | 0.7 | 114 |
| 4 | 4 | 0.20 | 5.62 | 17 | 0.5 | 27 | 0.8 | 128 |
| 5 | 5 | 0.25 | 6.93 | 12 | 0.4 | 24 | 0.7 | 114 |
| 6 | 6 | 0.30 | 8.20 | 2 | 0 | 17 | 0.5 | 2 |
| 7 | 7 | 0.35 | 9.44 | 0 | 0 | 0 | 0.1 | 0 |
| 8 | 1 | 0.05 | 1.47 | 0 | 0 | NT | NT | 0 |
| 9 | 2 | 0.10 | 2.89 | 0 | 0 | NT | NT | 0 |
| 10 | 3 | 0.15 | 4.27 | 8 | 0.3 | NT | NT | 114 |
| 11 | 4 | 0.20 | 5.62 | 5 | 0.2 | NT | NT | 88 |
| 12 | 5 | 0.25 | 6.93 | 16 | 0.5 | NT | NT | 105 |
| 13 | 6 | 0.30 | 8.20 | 15 | 0.5 | NT | NT | 105 |
| 14 | 7 | 0.35 | 9.44 | 11 | 0.3 | NT | NT | 93 |
| 15 | 1 | 0.05 | 1.47 | 0 | 0 | NT | NT | 0 |
| 16 | 2 | 0.10 | 2.89 | 2 | 0.1 | NT | NT | 67 |
| 17 | 3 | 0.15 | 4.27 | 9 | 0.3 | NT | NT | 102 |
| 18 | 4 | 0.20 | 5.62 | 12 | 0.4 | NT | NT | 119 |
| 19 | 5 | 0.25 | 6.93 | 2 | 0.1 | NT | NT | 44 |
| 20 | 6 | 0.30 | 8.20 | 1 | 0.1 | NT | NT | NT |

NT = Not Tested

The data in Table 1 show that an imidazoline catalyst can provide superior Impact Peel Resistance at 23° C. and 90° C., as well as superior T-peel adhesion at 23° C., over an optimum concentration range of catalyst.

Examples 21–38

Part B of an epoxy adhesive composition was prepared as in Examples 1–20. An epoxy adhesive was prepared by mixing 5.0 grains of Part B with varying amounts and types of tertiary amine and cyclic amidine catalysts as shown in Table 2. The amounts of catalyst are shown in grams and as a weight percent of the total weight of the reactive species (epoxy, catechol, and catalyst) and ranged from 1.47% to 9.44%. The OH-Amine/epoxy ratio was maintained at about 0.8. The adhesive compositions were tested for T-peel adhesion on steel substrates, as described above.

Examples C1–C5

The adhesives of Examples C1–C5 were prepared in the same manner as Examples 21–38 that the catalysts used that did not result in a suitable adhesive. The specific compounds and corresponding test data are shown in Table 2.

TABLE 2

| Ex | Catalyst | T-Peel - N-cm$^{-1}$ at varying % Catalyst | | | | | | |
|---|---|---|---|---|---|---|---|---|
| | Catalyst Concentration - grams | .05 | 0.10 | 0.15 | 0.20 | 0.25 | 0.30 | 0.35 |
| | Catalyst Concentration - wt % | 1.47 | 2.88 | 4.27 | 5.62 | 6.93 | 8.20 | 9.44 |
| 21 | 2-Ethyl-4-methylimidazoline | NT | 2 | 114 | 128 | 114 | 2 | 0 |
| 22 | 2-Benzyl-2-imidazoline | 0 | 0 | 114 | 88 | 105 | 105 | 93 |
| 23 | 4,4-Dimethyl-2-imidazoline | 0 | 67 | 102 | 119 | 44 | NT | NT |
| 24 | 1,4-Diazabicyclo<5.4.0>undec-7-ene | 0 | 0 | 23 | 88 | 110 | 50 | NT |
| 25 | 1,5-Diazabicyclo<4.3.0>non-5-ene | 0 | 47 | 79 | 88 | 84 | NT | NT |
| 26 | 1,4-Diazabicyclo<2.2.2>octane | 0 | 0 | 39 | NT | NT | NT | NT |
| 27 | 1-Acetylimidazole | 123 | 117 | 43 | 26 | NT | NT | NT |
| 28 | 2-Ethyl-4-methylimidazole | 70 | 67 | 70 | 67 | NT | NT | NT |
| 29 | 1-Benzyl-2-methylimidazole | 0 | 53 | 58 | 61 | 63 | NT | NT |
| 30 | 1-Butylimidazole | 65 | 56 | 63 | 53 | NT | NT | NT |
| 31 | 1-Butylpyrrolidine | 35 | 65 | 78 | 79 | 78 | NT | NT |
| 32 | 1-(2-Aminoethyl)piperidine | 0 | 44 | 44 | 53 | NT | NT | NT |
| 33 | 1-Vinylimidazole | 44 | 53 | 56 | 60 | 61 | NT | NT |
| 34 | 1,4,5,6-Tetrahydropyrimidine | 0 | 96 | 93 | 82 | NT | NT | NT |
| 35 | 1-Allylimidazole | 40 | 61 | 61 | 63 | 65 | NT | NT |
| 36 | 4-(4-Methylpiperidino)pyridine | 44 | 66 | 67 | 67 | NT | NT | NT |
| 37 | 1,2-Dimethylimidazole | 35 | 63 | 53 | 44 | NT | NT | NT |
| 38 | N,N'-Dimethylbenzylamine | 31 | 43 | 53 | 61 | 60 | NT | NT |
| C1 | Tributylamine | 0 | 0 | 0 | 0 | NT | NT | NT |
| C2 | 1-Phenylimidazole | 0 | 0 | 0 | 0 | NT | NT | NT |
| C3 | 2-Ethyl-4-methylthiazole | 0 | 0 | 0 | 0 | NT | NT | NT |
| C4 | 1-Methylindole | 0 | 0 | 0 | 0 | NT | NT | NT |
| C5 | 2-Phenyl-2-imidazoline | 0 | 0 | 0 | 0 | 0 | 0 | 0 |

NT = Not tested the results in Table 2 show how the T-peel adhesion performance of the epoxy adhesive compositions of the invention can vary by using different amounts and types of catalysts.

Examples 21, 24, 31, 34, and 38, at varying concentrations of catalyst based on the weight of the reactive species (%Cat) shown in Table 3, were also tested for Impact Resistance as measured by the crack propagation load and total energy at 23° C. and 90° C., and Overlap Shear Adhesion at 121° C. (Shear—MPa) on the steel substrate.

TABLE 3

| Ex | % Catalyst | Energy (J) @23° C. | Load (KN) @23° C. | Energy (J) @90° C. | Load (kN) @90° C. | Overlap Shear (MPa) @121° C. |
|---|---|---|---|---|---|---|
| 21 | 1.47 | 0 | 0 | 9 | 0.4 | 1.1 |
| 21 | 2.89 | 6.7 | 0.2 | 20 | 0.7 | 4.8 |
| 21 | 4.27 | 13 | 0.3 | 22 | 0.6 | 2.9 |
| 21 | 5.62 | 12 | 0.4 | 24 | 0.8 | 4.3 |
| 21 | 6.93 | 11 | 0.3 | 20 | 0.6 | 6.2 |
| 21 | 8.20 | 2 | 0.1 | 18 | 0.6 | 4.8 |
| 21 | 9.44 | 0 | 0 | 16 | 0.5 | 4.7 |
| 24 | 2.88 | 0 | 0 | 14 | 0 | 1.1 |
| 24 | 4.27 | 1 | 0 | NT | NT | 3.5 |
| 24 | 5.62 | 11 | 0.3 | NT | NT | 2.9 |
| 24 | 6.93 | 9 | 0.3 | 14 | 0.4 | 3.3 |
| 24 | 8.20 | 4 | 0.2 | 14 | 0.5 | 3.9 |
| 24 | 9.44 | 2 | 0.1 | 14 | 0.5 | 5.3 |
| 31 | 2.88 | 8 | 0.2 | 10 | 0.3 | 2.9 |
| 31 | 4.27 | 8 | 0.3 | 14 | 0.5 | 2.2 |
| 31 | 5.62 | 9 | 0.3 | 14 | 0.5 | 2.4 |
| 31 | 6.93 | 9 | 0.3 | 15 | 0.5 | 2.0 |
| 34 | 2.88 | 11 | 0.3 | 20 | 0.6 | 4.2 |
| 34 | 4.27 | 13 | 0.4 | 16 | 0.5 | 4.8 |
| 34 | 5.62 | 4 | 0.1 | 14 | 0.4 | 5.0 |
| 34 | 6.93 | 2 | 0 | 11 | 0.3 | 5.6 |
| 34 | 8.20 | 2 | 0.1 | 13 | 0.4 | 6.2 |
| 34 | 2.88 | 7 | 0.3 | 9 | 0.3 | 1.8 |
| 38 | 4.27 | 7 | 0.3 | 11 | 0.3 | 2.2 |
| 38 | 5.62 | 9 | 0.3 | 13 | 0.5 | 1.9 |
| 38 | 6.93 | 7 | 0.3 | 13 | 0.4 | 2.0 |
| 38 | 8.20 | 8 | 0.3 | 14 | 0.5 | 1.6 |

NT = Not tested

The data in Table 3 show the impact peel resistance, at room and elevated temperature, and the overlap shear strength, at elevated temperature, of the compositions of the invention can vary by using different amounts and types of the catalysts of the present invention.

The catalysts of Examples 21–38 fall within the broad classes of catalysts described as substituted cyclic amidines (Exs. 21–25, 27–30, 33–35 and 37), tertiary amines (Exs. 26 and 38), pyrrolidines (Ex. 31), piperidines (Ex. 32), or pyridines (Ex. 36). Some cyclic amidines are more sensitive to substitution chemistries than others. Some substituents can help and other substituents can hurt the catalyst performance of a cyclic amidine. The effectiveness of a cyclic amidine can be severly impaired by the wrong substitution chemistry. In addition, what substituent is on the nitrogen or adjacent to the nitrogen of the cyclic amidine linkage can determine the degree of catalytic activity exhibited by the catalyst. It is very difficult to predict the effect of a particular substitution chemistry and is, typically, determined by trial and error experimentation. While cyclic amidines can be particularly sensitive to the electron withdrawing effect of a substituent, they may also be sensitive to stereo chemical effects, such as steric hinderance. Tertiary amines can be particulary sensitive to a substituent that exhibits a high degree of steric hinderance; therefore, dimethyl substitution can be preferred. In general, pyrrolidines, piperidines and pyridines begin as less effective catalysts, and could become weaker when substituted.

The catalysts of Examples C1–C5 either were too sterically hindered (C1), contained too strong of an electron withdrawing group (C2 and C5), or were otherwise ineffective as a catalyst (C3 and C4) because of their inherent chemistry. In addition to containing a strong electron withdrawing group, the catalyst of Example C2 may also be sterically hindered and/or may not have the proper solubility. Some of the other catalysts used in the Table 2 examples may also be unacceptable for certain applications. For example, the adhesive of Example 26 may not be suitable (e.g., strong enough) for some structural bonding applications. In addition, the adhesives of Examples 28–33 and 35–38 may not be suitable (e.g., strong enough) for other structural bonding applications.

Another way that a catalyst can be ineffective is if it is insoluble or not adequately soluble in the Part A and B blend. A catalyst can also be ineffective or less effective when used to bond some substrates, but very effective when used to bond other substrates. This difference in effectiveness can be caused, at least in part, by the adhesive curing too quickly and not allowing sufficient time for the adhesive to sufficiently wet to the substrate surface. If it cures too quickly, the adhesive may not have the time needed to adequately wet out and bond to a particular substrate, thereby reducing the overall bond strength. Some substrates are less affected by rapid cure times, compared to other substrates. For instance, the etched aluminum substrates described above can be less sensitive to cure times than the galvanized steel substrates described above. In particular, even though Examples 46 and 49 use the same catalysts as that found in Examples 38 and 36, respectively, the adhesives of Examples 46 and 49 (i.e., bonded to the etched aluminum) exhibit dramatically improved T-peel adhesion compared to the adhesives of Examples 38 and 36 (i.e., bonded to the galvanized steel). There is also a significant improvement in the T-peel adhesion exhibited by the adhesive of Example 50 (i.e., bonded to the etched aluminum) compared to that of Example 39 (i.e., bonded to the galvanized steel), even though they are both imidazole catalyzed adhesives.

Examples 39–42

A Part B premix composition was made by adding 191 grams of Epon 828, 70 grams of MK107, 307 grams of the earlier Part B premix composition described for Examples 1–20, 154 grams of Shell resin 58006 and 122 grams of catechol to a glass jar, flushing with N2 then placing in an oven at 121° C. These components were allowed to melt with occasional agitation to form a homogeneous solution. This was then allowed to cool to ambient temperature, and 767 grams were transferred to a planetary mixing bowl. To this was added 196 grams of GP7I, 16.9 grams of TS720, 6.8 grams of K37 and 13.5 grams of glass beads. This was then mixed under vacumn for 20 minutes to a smooth, paste like consistency. To 5 gram portions of the resulting Part B composition were added respective amounts of each catalyst, as specified in Table 4. The amount of each catalyst is indicated in grams and % by weight of the reactive species. The adhesive compositions were tested for T-peel adhesion on steel substrates, as described above.

TABLE 4

| Ex Catalyst | T-Peel - N-cm$^{-1}$ at varying % Catalyst | | | | | |
| --- | --- | --- | --- | --- | --- | --- |
| Catalyst Concentration - grams | 0.05 | 0.1 | 0.15 | 0.20 | 0.30 | 0.40 |
| Catalyst Concentration - wt % | 1.51 | 3.02 | 4.51 | 6.01 | 7.51 | 9.01 |
| 39 Imidazole | 114 | 79 | 35 | NT | NT | NT |
| 40 1-Phenylimidazole | 5 | NT | 10 | NT | 26 | NT |
| 41 2-Phenylimidazole | 93 | 105 | 88 | NT | NT | NT |
| 42 1,2-Dimethyl-1,4,5,6-Tetrahydropyrimidine | NT | 88 | NT | 140 | NT | 18 |

NT = Not tested

The catalyst of Example 42 (i.e., 1,2-dimethyl-1,4,5,6-tetrahydropyrimidine) is manufactured by Koei Chemical Company of Osaka, Japan. As can be seen from the data in Table 4, the location of the phenyl substitutent on the imidazole ring can have a significant effect. In the 1 position, the electron withdrawing power of the phenyl substitutent is powerful enough to render the catalyst ineffective, as evidenced by the low T-peel strength (see also Example C2). In the 2 position, the electron withdrawing power of the phenyl substituent is much less, as evidenced by the relatively high T-peel strength. The electron withdrawing effect of the phenyl group is more significant in the 2 position on the imidazoline ring (i.e., substitution in the 2 position has more of a detrimental affect with imidazoline than with imidizole), as shown by Example C5. The type and location of a substituent can have more or less of an affect on the properties of the adhesive.

Examples 43–51

An epoxy resin premix composition was made by mixing 1016 grams of Epon 828 and 194 grams of Paraloid BTA IIIF core shell copolymer at an 84/16 weight ratio in a moderate shear mixer at 110° C. to 120° C. for about 1 hour. The mixture was substantially free of gel particles. Part B of an epoxy adhesive composition was prepared by placing 1000 grams of the premix into a jar with 190 grams of catechol. The jar was flushed with nitrogen and placed in an oven at 121° C. for about 30 minutes, with occasional agitation until the catechol disolves. The mixture was then cooled. Epoxy adhesive compositions were prepared by mixing portions of Part B with various catalysts in amounts over the range concentrations shown in the Table 5. The amounts of catalyst were varied from 0.5% to 6.4% as shown in Table 5 (Catalyst Concentration wt-%). The catalyst concentration is the percent of catalyst based on the total weight of the reactive species, i.e., the amounts of epoxy, catechol, and catalyst at an OH/Epoxy ratio of about 0.8. The adhesives were tested for T-peel adhesion to FPL etched aluminum substrates using the test method described above.

can be much less when bonded to a galvanized steel substrate, like that described above (i.e., less than half that shown in Table 5 for about the same catalyst concentrations).

Examples 52–58

An epoxy resin premix composition was prepared by mixing 500 grams of Epon™828 epoxy resin with 125 grams of Paraloid™EXL2600 copolymer using a high shear mixer at about 110° C. for about 30 minutes, and then cooling to ambient temperature. Part B of an epoxy adhesive was prepared by mixing 380 grams of the premix composition, 251 grams of Epon™828 epoxy resin, 73 grams of MK107 reactive diluent, 229 grams of GP-71 silica, 34 grams of K37 glass bubbles, 20 grams of Cab-O-Sil™TS-720 silica, and 14 grams of glass beads in a planetary mixer under vacuum for about 20 minutes.

A catalyst composition (Part A) was prepared by adding 60 grams of catechol and varying amounts of 2-ethyl-4-methylimidazoline as the catalyst (Catalyst Amt-gms) shown in Table 6 to a jar, flushing with nitrogen, and capping the jar. The resulting catalyst composition was heated in an oven at 125° C. with occasional agitation to form a Part A. The Part A was then cooled to ambient temperature. An epoxy adhesive composition was prepared by mixing 5.0 grams of Part B with varying amounts of Part A shown in Table 6. The specific amount of catalyst in grams (Catalyst Amt—gms) is shown in Table 6 as well as the specific amount of Part A in grams, and the amount of catalyst as a

TABLE 5

| Ex | Catalyst | T-Peel Adhesion (N-cm$^{-1}$) | | | | | | | |
|---|---|---|---|---|---|---|---|---|---|
|  | Catalyst Concentration - grams | 0.5 | 1.0 | 2.0 | 3.0 | 4.0 | 5.0 | 6.0 | 7.0 |
|  | Catalyst Concentration - wt % | 0.48 | 0.96 | 1.90 | 2.82 | 3.74 | 4.63 | 5.50 | 6.36 |
| 43 | 2-Ethyl-4-methylimidazole | NT | 5 | 165 | 175 | NT | 2 | NT | NT |
| 44 | 2-Ethyl-4-methylimidazoline | NT | 2 | 166 | 179 | 184 | 210 | 5 | 4 |
| 45 | 1,4-Diazabicyclo<5.4.0>undec-7-ene | NT | 2 | 2 | 2 | 2 | 175 | 168 | 7 |
| 46 | N,N'-Dimethylhenzylamine | NT | NT | 172 | 172 | 168 | 173 | 172 | NT |
| 47 | Dimethylethanolamine | NT | NT | 175 | 170 | 11 | 2 | 2 | NT |
| 48 | Bis(2-dimethylaminoethyl)ether | NT | NT | 172 | 158 | 147 | 9 | 11 | NT |
| 49 | 4-(4-Methylpiperidino)pyridine | NT | NT | 14 | 151 | 156 | 161 | NT | NT |
| 50 | Imidazole | NT | 140 | 158 | 9 | 2 | NT | NT | NT |
| 51 | 4-Dimethylaminopyridine | 2 | 9 | 131 | 128 | 79 | 81 | NT | NT |

The data in Table 5 show how the T-peel adhesion to FPL etched aluminum of epoxy adhesive compositions of the invention can vary by using different amounts and types of catalysts. The Bis(2-dimethylaminoethyl)ether catalyst is a commercially available catalyst manufactured by OSI Specialties Incorporated, of Danbury, Conn., under the name Niax A99. The T-peel adhesion of the Example 48 adhesive weight percent of the reactive species, i.e., epoxy, catechol, amine, and catalyst (% Cat). The OH-Amine/Epoxy ratio was maintained at about 0.8. The adhesives were tested for Impact Peel Resistance at 23° C. and 90° C. and Overlap Shear Adhesion at 121° C. to the galvanized steel substrates, as previously described, and the test results are shown in Table 6.

TABLE 6

| Ex. | Catalyst Amt - gms | Part A (gms) | % Cat. | Energy (J) @23° C. | Load (kN) @23° C. | Energy (J) @90° C. | Load (kN) @90° C. | Overlap Shear (MPa) @121° C. |
|---|---|---|---|---|---|---|---|---|
| 52* | 4.7 | 0.81 | 1.46 | 0 | 0 | NT | NT | 0.6 |
| 53* | 9.9 | 0.84 | 2.89 | 7 | NR | NT | NT | 4.5 |
| 54 | 15.2 | 0.88 | 4.33 | 24 | 0.8 | 29 | 0.9 | 5.6** |
| 55 | 21.4 | 0.91 | 5.75 | 24 | 0.7 | 32 | 1.0 | 6.6** |

TABLE 6-continued

| Ex. | Catalyst Amt - gms | Part A (gms) | % Cat. | Energy (J) @23° C. | Load (kN) @23° C. | Energy (J) @90° C. | Load (kN) @90° C. | Overlap Shear (MPa) @121° C. |
|---|---|---|---|---|---|---|---|---|
| 56 | 28.1 | 0.94 | 7.16 | 21 | 0.6 | 32 | 1.1 | 7.0** |
| 57 | 35.6 | 0.97 | 8.59 | 7 | 0.3 | 28 | 0.8 | 5.4** |
| 58 | 43.9 | 1.00 | 10.00 | 5 | 0.1 | 24 | 0.8 | NT |

*The solution of Part A was kept warm at around 75° C., after removal from the oven, and the Part B was warmed to @75° C., before mixing the two parts, in order to prevent the Catechol from recrystallizing.
**Results are from a different set of samples then that used for the impact data.
NT—not tested
NR—not recorded The data in Table 6 show how Impact Peel Resistance and Overlap Shear Adhesion can vary by using a mixture of different amounts of a preferred catalyst and a constant amount of catechol. It is undesirable for the catechol to recrystallize. Table 6 also shows that for a 2-ethyl-4-methylimidazoline catalyst, the catechol is less likely to recrystalize at higher concentrations of the catalyst.

Examples 59–68

A catalyst composition (Part A) was prepared by adding 60 grams of catechol, 40 grams of 3-amino-1-propanol and varying amounts of imidazole in grams (Cat—gms) as shown in Table 7 to ajar and heating in an oven at 121° C. with stirring for about 10 minutes. The Part A was then cooled to ambient temperature. Two part epoxy adhesives were prepared by mixing about 5 grams of Part B as is described in Examples 52–58 with varying amounts of Part A in grams (Part A—gms) shown in Table 7. The amounts of catalyst are also shown as a percent of the reactive species (% Cat), i.e., epoxy, catechol, amine, and catalyst. The OH-Amine/Epoxy ratio was maintained at about 0.75 for Examples 59–62 and at 0.8 for Examples 63–68.

The adhesives were tested for Impact Peel Resistance, T-Peel Adhesion at 23° C., and Overlap Shear Adhesion at 121° C. on steel as described above. Test results are shown in Table 7. Comparative Examples C6–C8 are state of the art epoxy adhesives that are used commercially in the automotive industry and test results are shown in Table 7. Comparative Example C6 is a structural one-part epoxy adhesive manufactured for Chrysler Corporation under the name MSCD 457B by Cemedine, U.S.A. Inc. of Oak Creek Wis., C7 is a structural one-part epoxy adhesive manufactured for Chrysler Corporation under the name MSCD 457C by PPG Industries of Adrian, Mich., and C8 is a structural one-part epoxy structural adhesive manufactured for General Motors under the name 998-1989 by PPG.

TABLE 7

| Ex. | Cat. Gms | Part A gms | % Cat. | Overlap Shear MPA @121° C. | T-Peel N-cm$^{-1}$ @23° C. | Energy J @23° C. |
|---|---|---|---|---|---|---|
| 59 | 4.8 | 0.63 | 0.75 | NT | 88 | 16 |
| 60 | 9.9 | 0.64 | 1.49 | NT | 70 | 15 |
| 61 | 21.3 | 0.66 | 2.98 | NT | 96 | 4 |
| 62 | 34.5 | 0.68 | 4.47 | NT | 91 | 4 |
| 63 | 2.2 | 0.66 | 0.37 | 3.6 | 26 | 1 |
| 64 | 4.5 | 0.67 | 0.75 | 4.3 | 91 | 18 |
| 65 | 6.9 | 0.67 | 1.13 | 3.8 | 93 | 17 |
| 66 | 9.3 | 0.68 | 1.50 | 3.6 | 79 | 20 |
| 67 | 11.9 | 0.68 | 1.88 | 4.1 | 105 | 20 |
| 68 | 14.5 | 0.68 | 2.25 | 4.8 | 102 | 16 |
| C6 | NA | NA | NA | 1.6 | 32 | 2 |
| C7 | NA | NA | NA | 2.5 | 35 | 2 |
| C8 | NA | NA | NA | 8.9 | 26 | 4 |

NT—Not Tested
NA—Data not applicable

The data in Table 7 show that adhesives of the invention can have an amount of imidazole as a catalyst which provide good Impact Peel Resistance and that formulations can be made which are superior over state of the art structural adhesives. Table 7 shows that the Impact Peel Resistance of the adhesive can be more sensitive to i.e., more adversely impacted by) increases in catalyst concentration than T-peel strength. So, the T-Peel strength can be acceptable while the Impact Peel Resistance is not.

Examples 69–72

Part A of an epoxy adhesive composition was prepared as in Examples 63–68 except with varying amounts (in grams) of imidazole shown in Table 8. The other components of Part A were 60 grams of catechol and 40 grams of 3-amino-1-propanol as described above.

Part B of an epoxy adhesive composition was prepared as in Examples 52–58. Epoxy adhesives were prepared by mixing about 5 grams of Part B with each Part A, containing a different amount of imidazole, shown in Table 8. The amounts of imidazole are shown in grams, as a percent of the reactive species (% Cat) and as a percent of the epoxy containing species (% Cat/Epoxy), i.e., Epon™ 828 and MK107. The OH-amine/Epoxy ratio was about 0.8. The adhesives were tested for T-Peel Adhesion on steel substrates at 23° C., as described above.

Comparative Example C9

An epoxy adhesive was prepared as in Example 69–72 except that the amount of imidazole was 0.25% of the epoxy materials, (% Cat/Epoxy) or 0.21% of the reactive species (% Cat). The adhesive was tested as in Examples 69–72.

TABLE 8

| Ex | Imidazole grams | Part A grams | % Cat | % Cat/Epoxy | T-Peel N-cm$^{-1}$ |
|---|---|---|---|---|---|
| C9 | 1.3 | 0.62 | 0.21 | 0.25 | 0 |
| 69 | 1.9 | 0.62 | 0.36 | 0.30 | 5 |
| 70 | 2.8 | 0.62 | 0.53 | 0.44 | 79 |
| 71 | 3.3 | 0.62 | 0.62 | 0.52 | 74 |
| 72 | 4.8 | 0.63 | 0.89 | 0.75 | 79 |

The data in Table 8 indicates that useful amounts of imidazole will be above about 0.35% and, preferably, above about 0.5%, based on the reactive species.

Examples 73–81

Two-part adhesives were prepared by mixing about 5 grams of Part B described in Examples 52–58 with varying amounts and compositions of Part A (Part A—grams) shown in Table 9. The OH-Amine/Epoxy ratio was kept constant at about 0.8. The amounts of catechol (Catechol grams), 3-amino-1-propanol (Amine grams) and 2-ethyl-4-methyl imidazoline (Catalyst grams) were varied as shown in Table 9. The amounts of catalyst (i.e., 2-ethyl imidazoline) as a percent by weight of the reactive materials (% Cat) in the formulations is also shown.

Part A was prepared by mixing the catechol, amine, and catalyst (i.e., 2-ethyl-4-methyl imidazoline) in a jar, flushed with nitrogen, and heating in an oven at 121° C. with occasional agitation for about 10 minutes. The Part A was then cooled to ambient temperature mixing with Part B.

The adhesives were tested for T-peel adhesion at 23° C. on cleaned and lubricated (i.e., lubed) steel, as described above.

TABLE 9

| Ex | Catechol grams | Amine grams | Catalyst grams | Part A Grams | % Cat | T-peel Adhesion N-cm$^{3}$ Cleaned | Lubed |
|---|---|---|---|---|---|---|---|
| 73 | 80 | 20 | 22.9 | 0.79 | 3.70 | 137 | 137 |
| 74 | 80 | 20 | 33.6 | 0.82 | 5.14 | 137 | 122 |
| 75 | 80 | 20 | 45.4 | 0.86 | 6.59 | 130 | 131 |
| 76 | 60 | 40 | 24.6 | 0.74 | 3.70 | 131 | 105 |
| 77 | 60 | 40 | 36.0 | 0.78 | 5.15 | 140 | 136 |
| 78 | 60 | 40 | 48.8 | 0.81 | 6.62 | 145 | 140 |
| 79 | 40 | 60 | 26.3 | 0.70 | 3.71 | 131 | 105 |
| 80 | 40 | 60 | 38.5 | 0.74 | 5.17 | 158 | 114 |
| 81 | 40 | 60 | 52.2 | 0.77 | 6.64 | 158 | 119 |

The data in Table 9 show that at a preferred stoichiometric ratio of OH-Amine/Epoxy of about 0.8, the adhesives of the invention can exhibit superior T-peel adhesion on both clean and lubricated steel over the range of the catechol to amine weight ratio and catalyst percentage.

Examples 82–93

These examples were prepared as in Examples 73–81 except that the stoichiometric ratios (OH-Amine-Epoxy ratio) were varied from about 0.5 to about 1.0, and the catechol and amine amounts were varied accordingly. Part A was mixed with about 5 grams of Part B described in Examples 52–58. The amounts and compositions of Part A are shown in Table 10. The catalyst (2-ethyl-4-methyl imidazoline) level was adjusted and is shown as a percent of the reactive species (% Cat). The adhesives were tested for T-peel adhesion on both cleaned and lubricated (Tubed) steel, as described above.

TABLE 10

| Ex | OH-Amine/ Epoxy ratio | Catechol grams | Amine Grams | Catalyst Grams | Part A Grams | % Cat | T-peel Adhesion N-cm$^{-1}$ Cleaned | Lubed |
|---|---|---|---|---|---|---|---|---|
| 82 | 0.5 | 80 | 20 | 55.5 | 0.56 | 5.27 | 40 | 79 |
| 83 | 0.6 | 80 | 20 | 45.4 | 0.65 | 5.22 | 56 | 96 |
| 84 | 0.7 | 80 | 20 | 38.5 | 0.74 | 5.18 | 119 | 119 |
| 85 | 0.8 | 80 | 20 | 33.6 | 0.82 | 5.14 | 136 | 123 |
| 86 | 0.9 | 80 | 20 | 29.9 | 0.92 | 5.11 | 49 | 61 |
| 87 | 1.0 | 80 | 20 | 27.0 | 1.0 | 5.08 | 0 | 0 |
| 88 | 0.5 | 60 | 40 | 60.0 | 0.53 | 5.27 | 44 | 79 |
| 89 | 0.6 | 60 | 40 | 48.8 | 0.61 | 5.22 | 53 | 79 |
| 90 | 0.7 | 60 | 40 | 41.5 | 0.69 | 5.20 | 88 | 114 |
| 91 | 0.8 | 60 | 40 | 36.0 | 0.78 | 5.15 | 140 | 137 |
| 92 | 0.9 | 60 | 40 | 32.0 | 0.86 | 5.12 | 157 | 131 |
| 93 | 1.0 | 60 | 40 | 29.0 | 0.95 | 5.11 | 0 | 0 |

The data in Table 10 show that the OH-Amine/Epoxy ratio can affect the T-peel results, independent of the catalyst concentration. In addition, at a relatively constant catalyst level, T-peel adhesion can be affected by the test substrate, the amounts of catechol and amine, and the OH-Amine/Epoxy ratio.

Examples 94–132

For each of examples 94–132, a Part A catalyst composition was prepared by mixing 60 grams of catechol with the types and amounts of amines (Amine—grams) and the amounts of 2-ethyl-4-methylimidazoline (Catalyst—grams) shown in Table 11 in a jar. The jars were flushed with nitrogen, capped, and then placed in an oven at 121° C. for 10 minutes with occasional agitation to form a homogeneous mixture. The compositions were then cooled. Part A for each of the examples has a 1:1 molar ratio of catechol to amine. The amount of Part A shown in Table 11 (Part A—grams) was mixed with about 5 grams of Part B described in Examples 52–58. The OH-Amine/Epoxy ratio was maintained at about 8.0 and the amount of catalyst based on the reactive materials (% Cat) is shown. T-peel adhesion test results on cleaned steel, obtained according to the previously described test method, for all of the Examples 94–132 are shown in Table 11.

The adhesives of Examples C10–C15 were prepared as for Examples 94–132 except that either the Part A recrystallized or the amine was insoluble in the Part A. As a result, none of these Examples could be tested.

TABLE 11

| Ex | Amine | Amine Grams | Catalyst Grams | Part A Grams | % Cat | T-Peel N-cm$^{-1}$ |
|---|---|---|---|---|---|---|
| 94 | 3-Amino-1-propanol | 41.0 | 34.0 | 0.77 | 4.76 | 140 |
| 95 | 2-Amino-2-methyl-1-propanol | 48.5 | 34.5 | 0.81 | 4.78 | 105 |
| 96 | Benzylamine | 58.5 | 34.8 | 0.87 | 4.74 | 161 |
| 97 | 2-Methylbutylamine | 47.4 | 34.3 | 0.81 | 4.77 | 152 |
| 98 | Isoamylamine | 47.4 | 34.3 | 0.81 | 4.77 | 131 |
| 99 | 2-Amino-1-methoxypropane | 48.6 | 34.3 | 0.81 | 4.75 | 131 |
| 100 | 2-(2-Aminoethoxy)ethanol | 57.2 | 34.7 | 0.86 | 4.75 | 145 |
| 101 | Sec-Butylamine | 40.0 | 34.0 | 0.76 | 4.75 | 131 |
| 102 | Octylamine | 71.0 | 35.0 | 0.94 | 4.68 | 145 |
| 103 | Tridecylamine | 109.0 | 36.8 | 1.16 | 4.65 | 119 |
| 104 | 3-(Hexyloxy)-1-propylamine | 91.5 | 36.0 | 1.06 | 4.82 | 123 |
| 105 | Hexylamine | 55.5 | 28.2 | 0.84 | 3.96 | 140 |
| 106 | 3-(di-n-Butylamino)propylamine | 101.5 | 36.5 | 1.12 | 4.67 | 137 |
| 107 | N,N'-Dibenzylethylenediamine | 131.0 | 37.5 | 1.29 | 4.61 | 137 |
| 108 | 1-Methylbutylamine | 47.4 | 34.3 | 0.81 | 4.77 | 140 |
| 109 | 2-Ethylhexylamine | 70.5 | 35.2 | 0.94 | 4.71 | 149 |
| 110 | Isobutylamine | 40.0 | 34.0 | 0.76 | 4.77 | 137 |
| 111 | Ethanolamine | 33.2 | 33.8 | 0.73 | 4.80 | 123 |
| 112 | 6-Aminocapronitrile | 61 | 34.8 | 0.89 | 4.73 | 161 |
| 113 | 4-Aminobenzylamine | 66.6 | 35.1 | 0.92 | 4.73 | 128 |
| 114 | Cyclohexylamine | 54.5 | 34.5 | 0.85 | 4.72 | 126 |
| 115 | Oleylamine | 151.5 | 38.3 | 1.4 | 4.52 | 128 |
| 116 | Decylamine | 86.5 | 36.0 | 1.0 | 4.69 | 131 |
| 117 | Dodecylamine | 101.5 | 36.5 | 1.12 | 4.66 | 137 |
| 118 | 3-(1-Methylethoxy)-1-propylamine | 67.6 | 35.0 | 0.92 | 4.71 | 163 |
| 119 | 3-(Isodecyloxy)-1-propylamine | 123.0 | 37.3 | 1.24 | 4.63 | 123 |
| 120 | 4-(3-Aminopropyl)morpholine | 78.5 | 35.0 | 0.99 | 4.65 | 145 |
| 121 | 4-Amino-1-butanol | 48.6 | 34.4 | 0.82 | 4.77 | 88 |
| 122 | 1,8-Diamino-p-menthane | 47.0 | 34.3 | 0.80 | 4.74 | 82 |
| 124 | Aminomethylbutyne | 46.3 | 34.3 | 0.80 | 4.77 | 79 |
| 125 | Tris(hydroxymethyl)amino Methane | 66.5 | 35.0 | 0.92 | 4.72 | 70 |
| 126 | H221 (Dixie Chemical) | 56.7 | 34.5 | 0.86 | 4.72 | 67 |
| 127 | 2-(2-Aminoethylamino)ethanol | 38.1 | 34.0 | 0.75 | 4.77 | 60 |
| 128 | n-Butylamine | 40.0 | 34.0 | 0.76 | 4.77 | 61 |
| 129 | Aminodiphenylmethane | 100.0 | 36.4 | 1.11 | 4.67 | 44 |
| 130 | 1,10-Diaminododecane | 47.0 | 25.8 | 0.78 | 3.71 | 44 |
| 131 | Diethylenetriamine | 22.9 | 33.4 | 0.67 | 4.78 | 35 |
| 132 | 3,3'-Diaminodipropylamine | 28.4 | 33.5 | 0.70 | 4.79 | 26 |
| C10 | Octadecylamine | 147.0 | 38.0 | 1.38 | 4.57 | R |
| C11 | 6-Aminocaproic acid | 71.5 | 35.2 | 0.95 | 4.71 | I |
| C12 | 4-Aminobutyric acid | 56.2 | 34.7 | 0.86 | 4.75 | I |
| C13 | 12-Aminodecanoic acid | 117.5 | 37.0 | 1.21 | 4.63 | R |
| C14 | t-Octylamine | 71.0 | 35.3 | 0.94 | 4.71 | R |
| C15 | Piperazine | 46.9 | 25.8 | 0.78 | 4.66 | I |

R = Part A recrystallized - not tested
I = Amine was Insoluble in the Part A - not tested The data in Table 11 show that the choice of amine chain extender can impact the performance (e.g., T-Peel Adhesion) of the resulting adhesive. Table 11 also shows that amines, which are useful as chain extenders in the practice of the invention, can include mono-primary amines and secondary diamines that are not too sterically hindered on the carbon alpha to the amine or on the amine itself and do not have strong electron withdrawing groups on amine sites.

Examples 133–139

An epoxy resin premix composition was prepared by mixing 500 grams of Epon™828 epoxy resin with 125 grams of Paraloid EXL2600 copolymer using a high shear mixer at a temperature between 110° C. to 120° C. for about 30 minutes and then cooling to ambient temperature. Part B was formed by mixing 330 grams of the epoxy premix, 164 grams of EPON™58006 resin, 209 grams of Epon™828 epoxy resin, 76 grams of MK107 reactive diluent, 231 grams of GP-71 silica, 8 grams of K37 glass bubbles, 20 grams of Cab-O-Sil™TS-720 silica, and 15 grams of glass beads in a planetary mixer under vacuum for 20 minutes.

A Part A catalyst composition was prepared by mixing in jars 60 grams of catechol with the types and amounts of amines and 2-ethyl-4-methylimidazoline catalyst (grams) shown in Table 12. The number of reactive equivalents of amine was maintained relatively constant for all of the Examples 133–139 at 0.22. The jars were flushed with nitrogen then placed in an oven at 121° C. for 10 minutes with occasional agitation. The compositions were cooled to ambient temperature. The amount of Part A shown in Table 12 (Part A—grams) was mixed with 5.0 grams of the Part B described above. The OH-Amine/Epoxy ratio was maintained at about 0.8 and the amount of catalyst (% Cat.) is shown based on the weight of the reactive species. The results of T-peel adhesion tests at 23° C. on steel, as described above, are also shown in Table 12.

TABLE 12

| Ex. | Amine | Amine grams | Catalyst grams | Part A grams | % Cat | T-Peel N-cm$^{-1}$ |
|---|---|---|---|---|---|---|
| 133 | 3-Methoxypropylamine | 10.0 | 26.8 | 0.84 | 5.91 | 149 |
| 134 | 2-Amino-1-methoxypropane | 10.0 | 26.8 | 0.84 | 5.91 | 140 |
| 135 | 2-(2-Aminoethoxy)ethanol | 11.5 | 26.8 | 0.86 | 5.91 | 152 |
| 136 | 3-(2-Methoxyethoxy)propylamine | 14.5 | 27.0 | 0.89 | 5.91 | 152 |
| 137 | 3-Isopropoxypropyl amine | 13.7 | 27.0 | 0.88 | 5.91 | 163 |
| 138 | 3-Isohexoxypropylamine | 18.5 | 27.2 | 0.92 | 5.88 | 158 |
| 139 | 3-Isodecoxypropyl amine | 25.0 | 27.5 | 0.98 | 5.85 | 158 |

The data in Table 12 show how the inventive adhesive can be formulated so as to maintain an OH-Amine/Epoxy ratio of about 0.8, while the molecular weight of the amine is increased, at a constant catalyst level. The data also show the utility of using ether amines with catechol as the chain extender.

Examples 140–153

A Part A catalyst composition was prepared by mixing in jars 80 grams of catechol and 20 grams of various amines with varying amounts of 2-ethyl-4-methylimidazoline catalyst (Cat—gms) shown in Table 13. The jars were flushed with nitrogen, placed in an oven at 121° C. for 10 minutes with occasional agitation to form a homogeneous mixture, and then cooled to ambient temperature. The amount of Part A in grams shown in Table 13 (Part A—gms) was mixed with 5.0 grams of the Part B described in Examples 133–139. The OH-Amine /Epoxy ratio was maintained at about 0.8 and the amount of catalyst (% Cat.) is shown based on weight of the reactive species. T-peel adhesion and Impact Peel Resistance test results measured as Load in kiloNewtons and Energy in Joules are shown in Table 13. All tests were performed on cleaned steel at 23° C., as described above.

TABLE 13

| Ex | Amine | Cat gms | Part A gms | % Cat | T-Peel N-cm$^{-1}$ | Load kN | Energy J |
|---|---|---|---|---|---|---|---|
| 140 | 3-Methoxypropylamine | 39.0 | 0.83 | 5.95 | 149 | 0.6 | 18 |
| 141 | 2-Amino-1-methoxypropane | 39.0 | 0.83 | 5.95 | 145 | 0.5 | 16 |
| 142 | 2-Amino-1-butanol | 39.0 | 0.83 | 5.95 | 140 | 0.5 | 15 |
| 143 | 2-Amino-2-methyl-1-propanol | 39.0 | 0.83 | 5.95 | 126 | 0.4 | 14 |
| 144 | 3-Amino-1-propanol | 41.0 | 0.80 | 6.02 | 145 | 0.6 | 18 |
| 145 | N,N'-Cyanoethylethylenediamine | 35.5 | 0.90 | 5.95 | 131 | 0.6 | 18 |
| 146 | sec-Butylamine | 41.0 | 0.80 | 6.00 | 135 | 0.5 | 15 |
| 147 | 2-Amino-1-methoxypropane | 39.0 | 0.84 | 6.00 | 131 | NT | NT |

TABLE 13-continued

| Ex | Amine | Cat gms | Part A gms | % Cat | T-Peel N-cm$^{-1}$ | Load kN | Energy J |
|---|---|---|---|---|---|---|---|
| 148 | 3-Ethoxypropylamine | 38.0 | 0.86 | 6.01 | 137 | NT | NT |
| 149 | 3-Isopropoxypropylamine | 37.0 | 0.88 | 5.99 | 119 | NT | NT |
| 150 | 2-Ethoxyethylamine | 39.0 | 0.83 | 5.99 | 140 | NT | NT |
| 151 | 2-(2-Aminoethoxy)ethanol | 38.0 | 0.86 | 6.03 | 128 | NT | NT |
| 152 | 1-Amino-2-propanol | 40.5 | 0.81 | 6.03 | 131 | NT | NT |
| 153 | 3-(2-Methoxyethoxy)-propylamine | 36.5 | 0.89 | 6.01 | 128 | NT | NT |

NT = Not tested

The data in Table 13 show additional useful amines in the practice of the invention. Examples 145 and 149 are amines manufactured by Tomah Products Inc. of Tomah, Wis. under the product designations Tomah 159-6 and Tomah PA-7, respectively.

Examples 154–167

The exemplary epoxy adhesives were prepared by mixing 0.2 grams of 2-ethyl-4-methylimidazoline with about 5 grams of the Part B of Examples 52–58 plus the phenolic compounds of Table 14 in the amounts indicated. An OH-Amine/Epoxy ratio of about 0.7 was maintained. The compositions were tested for T-Peel adhesion on steel at 23° C. and results are shown in Table 13. Comparative Examples C16–C21 were prepared as for Examples 154–167 except using the phenolic compounds shown in Table 14.

TABLE 14

| Ex | Phenolic | Amount - Grams | T-Peel - N-cm$^{-1}$ |
|---|---|---|---|
| 154 | Catechol | 0.68 | 136 |
| 155 | 3-Fluorocatechol | 0.8 | 93 |
| 156 | 3-Methylcatechol | 0.78 | 117 |
| 157 | 4-Methylcatechol | 0.78 | 88 |
| 158 | Resorcinol | 0.69 | 53 |
| 159 | 3-Methoxycatechol | 0.88 | 117 |
| 160 | 1/1 equivalents catechol/resorcinol | 0.34/0.34 | 137 |
| 161 | 1/1 equivalents catechol/Bisphenol A | 0.34/0.71 | 137 |
| 162 | 1/1.8 equivalents catechol/Bisphenol A | 0.23/0.91 | 131 |
| 163 | 2,3-Dihydroxynaphthalene | 1.0 | 79 |
| 164 | None | 0 | 26 |
| 165 | 3,5-Di-t-butylcatechol | 1.39 | 46 |
| 166 | Pyrogallic acid | 0.52 | 35 |
| 167 | Octylpyrogallol | 0.99 | 26 |
| C16 | 2,3-Dihydroxybenzoic acid | 0.64 | * |
| C17 | 3,4-Dihydroxybenzoic acid | 0.64 | * |
| C18 | 3,4-Dihydroxybenzaldehyde | 0.86 | * |
| C19 | 4-Nitrocatechol | 0.98 | * |
| C20 | Gallic acid | 0.54 | 0 |
| C21 | Lauryl gallate | 1.41 | 0 |

*Phenolic did not dissolve to make a homogeneous solution

The data in Table 14 show the affect of various phenolic chain extenders, including the use of chain extender, on T-peel adhesion performance.

Examples 168–194

Part B compositions for these two-part epoxy adhesives were prepared as follows:

Composition I

Composition I was prepared by mixing 620 grams of Epon™828 epoxy resin, 82 grams of MK 107 reactive diluent, 251 grams of GP-71 silica, 9 grams of K37 glass bubbles, 22 grams of Cab-O-Sil™TS-720 silica, and 16 grams. of glass beads in a planetary mixer for 20 minutes. The epoxide equivalent weight was 259.

Composition II

An epoxy resin premix composition was prepared by mixing 144 grams of a polytetramethylene oxide diamine (Toughener A), such as that disclosed in U.S. Pat. No. 3,436,359, issued Apr. 1, 1969 and incorporated herein by reference, in 5 gram increments over a period of 10 minutes to 626 grams of Epon™828 epoxy resin using a Meyers type mixing blade in a quart can at 100° C. Composition II was prepared by mixing 700 grams of the premix with 76 grams of MK 107 reactive diluent, 231 grams of GP-71 silica, 8 grams of K37 glass bubbles, 20 grams of Cab-O-Sil™TS-720 silica, and 15 grams of glass beads in a planetary mixer for 20 minutes under vacuum. The epoxide equivalent weight was 295.

Composition III

Composition III was prepared by mixing 327 grams of EPON™ 58006 resin (Toughener B), 372 grams of Epon™828 epoxy resin, 76 grams of MK 107 reactive diluent, 231 grams of GP-71 silica, 8 grams of K37 glass bubbles, 20 grams of Cab-O-Sil™TS-720 silica, and 15 grams of glass beads in a planetary mixer under vacuum for about 20 minutes. The epoxide equivalent weight was 302.

Composition IV

An epoxy resin premix composition was prepared by mixing 140 grams of Paraloid EXL2600 copolymer (Toughener C) and 560 grams of Epon™828 epoxy resin as described above for Examples 52–58. Composition IV was prepared by mixing 655 grams of the premix composition, 45 grams of Epon™828 epoxy resin, and 75 grams of MK 107 reactive diluent, 231 grams of GP-71 silica, 8 grams of K37 glass bubbles, 20 grams of Cab-O-Sil™TS-720 silica, and 15 grams of glass beads in a planetary mixer under vacuum for about 20 minutes. The epoxide equivalent weight was 295.

A premix for a Part A catalyst composition was prepared by combining 228 grams of 2-ethyl-4-methylimidazoline, 5 grams of a poly tetramethylene oxide diamine, and 625 grams catechol in a jar, flushed with nitrogen, and then capped. 818 grams of the resulting premix composition was heated in an oven at 121° C. with occasional vigorous agitation over a period of 30 minutes to form a homogenous solution. After cooling to ambient temperature, the premix was transferred to a planetary mixer bowl and 12 grams of carbon black (available from DeGussa Pigments Division of Teterboro, N.J., under the product name Printex 3), 14 grams of GP7I silica, 21 grams of TS720 silica and 4 grams of K37 glass bubbles were added. The Part A composition was mixed under vacuum for 20 minutes. Because the amount of catechol is about three times the amount of catalyst, there may be a risk of this Part A composition recrystallizing. To avoid this risk and still maintain a high content of catechol, the amount of catechol in the Part A can be reduced and catechol added to the Part B.

Epoxy adhesive compositions for Examples 168–194 were prepared by mixing 1.0 gram of Part A with varying amounts of Part B Compositions in grams shown in Table 15. The Part B was prepared by mixing the amounts by weight of the above Compositions I–IV, e.g., Example 168 has 4.5 grams of Composition II and 0 grams of Composition I. The amounts of Part B were adjusted to maintain an OH-Amine/Epoxy ratio of about 0.8, and the % by weight of each toughener (A, B C) based on the weight of total epoxy is also shown. At increasing concentrations of toughener A, the Part B may thicken with time. Therefore, it may be desirable for the Epoxy composition to be mixed and applied to the substrates soon after the Part B is formed. The adhesives were tested for T-peel adhesion at 23° C. and Impact Peel Resistance Energy at 90° C. on steel substrates, as described above. The test results are shown in Table 15.

Examples 169A, 170A, 172A–174A, 177A–182A

Part B compositions these examples were prepared in the same manner as for Examples 169–182 except the relative amounts of part B compositions I–IV used in Examples 169–182 were adjusted to reflect an OH/epoxy stoichiometry of 0.75. The same part A composition used for examples 169–182 was used.

Epoxy adhesive compositions were prepared by mixing 1.0 grams of the part A with respective amounts of the part B compositions I–IV shown in Table 15. The adhesives were tested for Impact Peel Resistance at –40° C., –30° C. and –20° C. on steel substrates as described above. Test results are shown in Table 15.

TABLE 15

| Ex | Part B Composition Grams | | | | % Toughener | | | T-Peel | Energy (J) @ | | |
|---|---|---|---|---|---|---|---|---|---|---|---|
| | I | II | III | IV | A | B | C | N-cm⁻¹ | 90° C. | –20° C. | –30° C. | –40° C. |
| 168 | 0 | 4.50 | 0 | 0 | 20.3 | 0 | 0 | 79 | 14 | — | — | — |
| 169 | 1.08 | 3.26 | 0 | 0 | 15.2 | 0 | 0 | 82 | 14 | — | — | — |
| 169A | 1.16 | 3.48 | 0 | 0 | 15.2 | 0 | 0 | — | — | 6 | 4 | 3 |
| 170 | 2.11 | 2.11 | 0 | 0 | 10.2 | 0 | 0 | 70 | 10 | — | — | — |
| 170A | 2.25 | 2.25 | 0 | 0 | 10.2 | 0 | 0 | — | — | 6 | 4 | 3 |
| 171 | 0 | 0 | 4.61 | 0 | 0 | 20.3 | 0 | 117 | 17 | — | — | — |
| 172 | 1.10 | 0 | 3.32 | 0 | 0 | 15.2 | 0 | 114 | 17 | — | — | — |
| 172A | 1.18 | 0 | 3.54 | 0 | 0 | 15.2 | 0 | — | — | 7 | 7 | 4 |
| 173 | 2.12 | 0 | 2.12 | 0 | 0 | 10.2 | 0 | 114 | 17 | — | — | — |
| 173A | 2.27 | 0 | 2.27 | 0 | 0 | 10.2 | 0 | — | — | 8 | 5 | 3 |
| 174 | 0 | 0 | 0 | 4.50 | 0 | 0 | 20.3 | 158 | 18 | — | — | — |
| 174A | 0 | 0 | 0 | 4.8 | 0 | 0 | 20.3 | — | — | 11 | 4 | 3 |
| 175 | 1.09 | 0 | 0 | 3.26 | 0 | 0 | 15.2 | 128 | 15 | — | — | — |
| 176 | 2.11 | 0 | 0 | 2.11 | 0 | 0 | 10.2 | 114 | 15 | — | — | — |
| 177 | 0 | 3.62 | 0.90 | 0 | 16.2 | 4.1 | 0 | 105 | 18 | — | — | — |
| 177A | 0 | 3.86 | .96 | 0 | 16.2 | 4.1 | 0 | — | — | 9 | 8 | 6 |
| 178 | 0 | 2.72 | 1.82 | 0 | 12.2 | 8.1 | 0 | 110 | 16 | — | — | — |
| 178A | 0 | 2.90 | 1.94 | 0 | 12.2 | 8.1 | 0 | — | — | 10 | 9 | 7 |
| 179 | 1.72 | 1.29 | 1.29 | 0 | 6.1 | 6.1 | 0 | 114 | 20 | — | — | — |
| 179A | 1.83 | 1.37 | 1.37 | 0 | 6.1 | 6.1 | 0 | — | — | 8 | 7 | 6 |
| 180 | 0 | 2.27 | 2.27 | 0 | 10.2 | 10.2 | 0 | 114 | 20 | — | — | — |
| 180A | 0 | 2.43 | 2.43 | 0 | 10.2 | 10.2 | 0 | — | — | 11 | 9 | 6 |
| 181 | 0 | 1.82 | 2.74 | 0 | 8.1 | 12.2 | 0 | 114 | 20 | — | — | — |
| 181A | 0 | 1.95 | 2.92 | 0 | 8.1 | 12.2 | 0 | — | — | 9 | 8 | 6 |
| 182 | 0 | 0.92 | 3.66 | 0 | 4.1 | 16.2 | 0 | 123 | NT | — | — | — |
| 182A | 0 | .98 | 3.91 | 0 | 4.1 | 16.2 | 0 | — | — | 8 | NT | 6 |
| 183 | 0 | 3.60 | 0 | 0.90 | 16.2 | 0 | 4.1 | 96 | NT | — | — | — |
| 184 | 0 | 2.70 | 0 | 1.80 | 12.2 | 0 | 8.1 | 105 | 15 | — | — | — |
| 185 | 1.70 | 1.28 | 0 | 1.28 | 6.1 | 0 | 6.1 | 114 | 14 | — | — | — |
| 186 | 0 | 2.25 | 0 | 2.25 | 10.2 | 0 | 10.2 | 119 | 17 | — | — | — |
| 187 | 0 | 1.80 | 0 | 2.70 | 8.1 | 0 | 12.2 | 117 | 18 | — | — | — |
| 188 | 0 | 0.90 | 0 | 3.60 | 4.1 | 0 | 16.2 | 131 | 16 | — | — | — |
| 189 | 0 | 0 | 3.66 | 0.92 | 0 | 16.2 | 4.1 | 131 | 18 | — | — | — |
| 190 | 0 | 0 | 2.74 | 1.82 | 0 | 12.2 | 8.1 | 140 | 20 | — | — | — |
| 191 | 1.72 | 0 | 1.29 | 1.29 | 0 | 6.1 | 6.1 | 128 | 19 | — | — | — |
| 192 | 0 | 0 | 2.28 | 2.28 | 0 | 10.2 | 10.2 | 152 | 18 | — | — | — |
| 193 | 0 | 0 | 1.82 | 2.72 | 0 | 8.1 | 12.2 | 140 | 18 | — | — | — |
| 194 | 0 | 0 | 0.90 | 3.62 | 0 | 4.1 | 16.2 | 140 | 18 | — | — | — |

NT = Not Tested

The data in Table 15 show how varying amounts, types and combinations of toughners, with the same Part A composition, can affect T-Peel Adhesion and Impact Peel Resistance.

Examples 195–199

Part B compositions were prepared as follows:

Composition V

An epoxy resin premix composition was prepared by mixing 436 grams of Epon 828 epoxy resin with 68 grams of EXL2600 copolymer using a high shear mixer at a temperature between 110° C. to 120° C. for about 30 minutes at which time cooling was initiated while mixing continued. When the temperature reached 100° C., 100 grams of catechol was added with continued mixing. After 5 minutes a homogeneous mix was obtained with no evidence of gel particles or undissolved catechol. Composition V was prepared by transferring 550 grams of this premix to a planetary mixer bowl along with 65 grams of MK107 reactive diluent, 155 grams of Epon 58006 epoxy resin, 199 grams of GP7I silica, 17 grams of TS-720 fumed silica, 2 grams of K37 glass bubbles, and 13 grams of glass beads and mixing under vacuum for 20 minutes to a smooth paste like consistency.

Composition VI

An epoxy resin premix composition was prepared by mixing 470 grams of Epon 828 epoxy resin with 46 grams of Paraloid EXL2600 copolymer using a high shear mixer at a temperature between 110° C. to 120° C. for about 30 minutes at which time cooling was initiated while mixing continued. When the temperature reached 100° C., 46 grams of Toughener A (polytetramethylene oxide diamine) were added in approximately 5 gram amounts over a period of about 10 minutes with continuous mixing to obtain a homogeneous solution with no evidence of undissolved Toughener A. Then 100 grams of catechol were added with continuous mixing for another 5 minutes or until a homogenous solution was obtained. Composition VI was prepared by transferring 601 grams of this premix into a planetary mixer bowl along with 65 grams of MK107 reactive diluent, 103 grams of Epon 58006 epoxy resin, 199 grams of GP71 silica, 17 grams of TS720 fumed silica, 2 grams of K37 glass bubbles, and 13 grams of glass beads and mixing under vacuum for 20 minutes to a smooth paste like consistency.

Composition VII

An epoxy/core shell premix was prepared by mixing 560 grams of Epon 828 epoxy resin with 140 grams of EXL 2600 copolymer using a high shear mixer at a temperature between 110° C. to 120° C. for about 30 minutes. 676 grams of this premix was then transferred to a planetary mixing bowl. To this was added 171 grams of 58006, 71 grams of MK107, 219 grams of GP7I, 19 grams of TS720 and 14 grams of glass beads then mixing under vacuum for 20 minutes to a smooth paste like consistency.

Composition VIII

An epoxy resin premix composition was prepared by mixing 518 grams of Epon 828 epoxy resin with 50 grams of Paraloid EXL2600 copolymer using a high shear mixer at a temperature between 110° C. to 120° C. for about 30 minutes at which time cooling was initiated while mixing continued. When the temperature reached 100° C., 50 grams of Toughener A was added in approximately 5 gram amounts over a period of about 10 minutes with continuous mixing until achieving a homogeneous solution showing no evidence of undissolved Toughener A. Composition VIII was prepared by transferring 562 grams of this premix to a planetary mixer bowl along with 71 grams of MK107 reactive diluent, 114 grams of Epon 58006 resin, 219 grams of GP7I silica, 19 grams of Cab-O-Sil TS720 fumed silica, and 14 grams of glass beads and mixing under vacuum for 20 minutes to a smooth paste like consistency.

Composition IX

A Part B composition was made by combining 197 grams of Epon 828, 72 grams of MK107, 317 grams of the epoxy/core-shell premix described for Composition VII, 159 grams of Epon 58006 resin, 222 grams of GP7I, 19 grams of TS720 and 14 grams of glass beads. This combination was mixed under vacuum for 20 minutes to a smooth paste like consistency.

Part A compositions were prepared as follows:

Composition AA

A premix composition was made by combining 509 grams of 2-ethyl-4-methylimidazoline and 254 grams of catechol in a glass jar, flushing with N2 then heating at 121° C. with occasional agitation to form a homogeneous solution. Composition AA (Part A) was prepared by transferring 695 grams of the premix to a planetary mixer bowl along with 265 grams of GP7I silica, 51 grams of Cab-O-Sil TS720 fumed, and 10 grams of K37 glass bubbles. These components were mixed for 5 minutes, then 10 grams of Printex 3 carbon black were added and the entire composition mixed under vacuum for 20 minutes.

Composition BB

A premix composition was made by combining 250 grams of 2-ethyl-4-methylimidazoline, 132 grams of 3-ethoxyproplyamine, 391 grams of catechol, and 108 grams of resorcinol in a glass jar, flushing with nitrogen, and then heating at 121° C. with occasional agitation to form a homogeneous solution. The resorcinol is added to insure that the catechol will not recrystallize in the Part A. Composition BB (Part A) was prepared by transferring 800 grams of the premix to a planetary mixing bowl along with 156 grams of GP7I silica, 22 grams of Cab-O-Sil TS720 fumed silica, and 18 grams of K37 glass bubbles and mixed for 5 minutes. Then 4.5 grams of Printex 3 carbon black were added and mixed under vacuum for 20 minutes.

Composition CC

A premix composition was prepared by combining 238 grams of 2-ethyl-4-methylimidazoline, 143 grams of 3-amino-1-propanol, 376 grams of catechol and 43 grams of resorcinol in a glass jar, flushing with N2 then heating a@121C. with occasional agitation to form a homogeneous solution. The resorcinol is added to at least help insure that the catechol will not recrystallize in the Part A. Composition CC (Part A) was then prepared by transferring 727 grams of the above premix into a planetary mixing bowl along with 208 grams of GP7I silica, 13 grams of Cab-O-Sil TS720, 48 grams of K37 glass bubbles, and 4 grams of Printex 3 carbon black. This combination was then mixed for 20 minutes under vacumn. The resulting catechol/3-aminopropanol weight ratio is 70/30.

Two-part adhesive compositions were prepared by mixing various combinations and amounts of the above Part B compositions (Compositions V, VI, VII, VIII and IX) with the above Part A compositions (Compositions AA, BB and CC) as shown in Table 16. The amounts are given in grams by weight, and the volumetric mix ratio of Part B to Part A (Mix Ratio—B/A). The adhesives were tested for T-Peel Adhesion and Impact Peel Resistance at 23° C. on steel, as described above. Other dimensions of the test samples remained as described above. The catalyst level was maintained at 4% (by weight of the total two-part adhesive composition). The effect of the high amine equivalent weight of Toughener A material on stoichiometry is insignificant and is not included in the calculations. The OH-Amine/Epoxy ratio was kept constant at about 0.8 respectively. Test results are shown in Table 16.

TABLE 16

| Ex | Part A Grams | Part B Grams | Mix Ratio B/A | T-Peel (N-cm$^{-1}$) @ 23° C. | Energy (J) @ 23° C. |
|---|---|---|---|---|---|
| 195 | 1.08-AA | 11.61-V | 10:1 | 161 | NT |
| 196 | 1.08-AA | 11.61-VI | 10:1 | 140 | 17 |
| 197 | 2.25-BB | 10.53-VII | 4:1 | 172 | NT |
| 198 | 2.25-BB | 10.53-VIII | 4:1 | 145 | 19 |
| 199 | 2.00-CC | 9.02-IX | 4:1 | 140 | NT |

NT = Not Tested

Examples 200–231

A Part B composition was prepared as for Examples 52–58. Each catalyst composition (Part A) was prepared by adding 47 grams of catechol, 47 grams of dodecylamine, and varying amounts of imidazole or 2-ethyl-4-methylimidazoline or combinations thereof as the catalyst (Cat—grams) shown in Table 17 to a jar, flushing with nitrogen, and then capping the jar. The jars of compositions were then heated in an oven at 121° C. with occasional agitation to form a Part A. The Part A was then cooled to ambient temperature.

An epoxy adhesive composition was prepared by mixing 5.0 grams of Part B with varying amounts of Part A shown in Table 17. The specific amount of catalyst in grams (Cat grms) is shown as well as the specific amount of Part A (Part A gms), the amount of catalyst as a percent of reactive species, i.e. epoxy, catechol, amine, and catalyst (% Cat) and the amount of catalyst as a percent of the total adhesive formulation (% T). The OH-Amine/Epoxy ratio was 0.75 for Examples 200–215 and 0.95 for Examples 216–231. The adhesive compositions were tested for T-Peel Adhesion and Overlap Sear strength at 23° C. on lubricated steel using G60HDES galvanized steel and a Fuchs 4107S lubricant at a coating weight of 300 mg-ft$^{-2}$.

TABLE 17

| | Imidazole | | | | 2-Ethyl-4-methylimidazoline | | | | | |
|---|---|---|---|---|---|---|---|---|---|---|
| Ex | % Cat | % T | Cat gms | Part A Gms | % Cat | % T | Cat gms | Part A gms | Shear MPa | T-Peel N-cm$^{-1}$ |
| 200 | 0.075 | 0.05 | 0.32 | 0.88 | 0 | 0 | 0 | 0 | 2.5 | 2 |
| 201 | 0.148 | 0.10 | 0.63 | 0.88 | 0 | 0 | 0 | 0 | 3.3 | 2 |
| 202 | 0.223 | 0.15 | 0.95 | 0.88 | 0 | 0 | 0 | 0 | 3.2 | 2 |
| 203 | 0.303 | 0.20 | 1.30 | 0.88 | 0 | 0 | 0 | 0 | 8.1 | 9 |
| 204 | 0.732 | 0.50 | 3.20 | 0.88 | 0 | 0 | 0 | 0 | 19.4 | 102 |
| 205 | 0 | 0 | 0 | 0 | 1.49 | 1.0 | 6.60 | 0.90 | 18.9 | 67 |
| 206 | 0 | 0 | 0 | 0 | 2.96 | 2.0 | 13.80 | 0.92 | 20.1 | 105 |
| 207 | 0 | 0 | 0 | 0 | 4.44 | 3.0 | 21.80 | 0.95 | 20.2 | 131 |
| 208 | 0 | 0 | 0 | 0 | 5.91 | 4.0 | 30.70 | 0.97 | 19.4 | 140 |
| 209 | 0.043 | 0.022 | 0.15 | 0.92 | 2.96 | 2.0 | 13.80 | 0.92 | 20.1 | 123 |
| 210 | 0.084 | 0.042 | 0.29 | 0.92 | 2.95 | 2.0 | 13.80 | 0.92 | 19.5 | 123 |
| 211 | 0.171 | 0.085 | 0.59 | 0.92 | 2.94 | 2.0 | 13.80 | 0.92 | 20.0 | 140 |
| 212 | 0.338 | 0.228 | 1.60 | 0.92 | 2.92 | 2.0 | 13.80 | 0.92 | 19.9 | 131 |
| 213 | 0.020 | 0.020 | 0.16 | 0.97 | 5.90 | 4.0 | 30.70 | 0.97 | 20.1 | 140 |
| 214 | 0.041 | 0.040 | 0.31 | 0.97 | 5.88 | 4.0 | 30.70 | 0.97 | 20.0 | 123 |
| 215 | 0.082 | 0.080 | 0.62 | 0.97 | 5.88 | 4.0 | 30.70 | 0.97 | 19.9 | 123 |
| 216 | 0.073 | 0.05 | 0.26 | 1.11 | 0 | 0 | 0 | 0 | 3.3 | 2 |
| 217 | 0.146 | 0.10 | 0.52 | 1.11 | 0 | 0 | 0 | 0 | 5.1 | 2 |
| 218 | 0.219 | 0.15 | 0.78 | 1.11 | 0 | 0 | 0 | 0 | 18.1 | 88 |
| 219 | 0.294 | 0.20 | 1.05 | 1.11 | 0 | 0 | 0 | 0 | 18.3 | 88 |
| 220 | 0.743 | 0.50 | 2.70 | 1.11 | 0 | 0 | 0 | 0 | 19.6 | 114 |
| 221 | 0 | 0 | 0 | 0 | 1.47 | 1.0 | 5.40 | 1.14 | 18.8 | 96 |
| 222 | 0 | 0 | 0 | 0 | 2.92 | 2.0 | 11.20 | 1.16 | 20.1 | 131 |
| 223 | 0 | 0 | 0 | 0 | 4.37 | 3.0 | 17.50 | 1.18 | 19.9 | 110 |
| 224 | 0 | 0 | 0 | 0 | 5.80 | 4.0 | 24.30 | 1.21 | 11.3 | 9 |
| 225 | 0.043 | 0.021 | 0.11 | 1.16 | 2.92 | 2.0 | 11.20 | 1.16 | 19.9 | 78.8 |
| 226 | 0.087 | 0.041 | 0.23 | 1.16 | 2.92 | 2.0 | 11.20 | 1.16 | 19.9 | 70.1 |
| 227 | 0.174 | 0.082 | 0.46 | 1.16 | 2.92 | 2.0 | 11.20 | 1.16 | 20 | 131 |
| 228 | 0.347 | 0.238 | 1.35 | 1.16 | 2.92 | 2.0 | 11.30 | 1.16 | 19.9 | 93 |
| 229 | 0.021 | 0.022 | 0.13 | 1.21 | 5.79 | 4.0 | 24.30 | 1.21 | NT | 2 |
| 230 | 0.041 | 0.044 | 0.25 | 1.21 | 5.81 | 4.0 | 24.40 | 1.21 | NT | 2 |
| 231 | 0.082 | 0.087 | 0.50 | 1.21 | 5.81 | 4.0 | 24.50 | 1.21 | NT | 2 |

NT = Not Tested

The data in Table 17 show various combinations of imidazole and 2-ethyl-4-methylimidazoline as well as individual catalysts alone for a stoichiometry (i.e., OH-Amine/Epoxy ratio) of 0.75 and 0.95. The data in Table 17 indicates that when a combination of catalysts are used, lower concentrations of each catalyst can be used to provide excellent Overlap Shear strength and T-Peel adhesion. In addition, by using a combination of catalysts at an appropriate level, the performance of the adhesive composition (e.g., Overlap Shear strength and T-Peel adhesion) can be maintained over a broad stoichiometric range, thereby reducing the off-ratio sensitivity of the composition. For example, compare the difference between Examples 208 and 224 with the similarity between Examples 211 and 227. Furthermore, Table 17 indicates that as the OH-Amine/Epoxy ratio increases, the amount of 2-ethyl-4-methylimidazoline in the Part A can have more of an affect on the T-peel adhesion and Overlap Shear strength (i.e., the T-peel adhesion and Overlap Shear strength become more sensitive to the 2-ethyl-4-methylimidazoline concentration at higher stoichiometric ratios).

Examples 232–247

Part A catalyst compositions were prepared as in Examples 94–132 by mixing catechol with various types of amines at weight ratios of 60/40 and 40/60 catechol to amine (Cate/Amine Ratio) and varying amounts of 2-ethyl-4-methylimidazoline as the catalyst as shown in Table 18. The amount of Part A shown in Table 18 below was mixed with about 5 grams of the Part B described in Examples 52–58. The OH-Amine/Epoxy ratio was maintained at about 0.8. The amount of catalyst based on the total formulation (% T) and the amount of catalyst based on the reactive species (% Cat) are shown with sustained load results in Table 18.

Example 248

The catalyst (2-ethyl4-methylimidazoline) was added directly to 5.8 grams of the Part B described in Examples 1–20. Sustained load test results are shown in Table 18.

Example 249

A Part A composition was made by combining 4.6 grams of 2-ethyl-4-methylimidazoline, 4.1 grams of catechol and 0.5 grams of resorcinol in a jar, flushing with nitrogen, then capping the jar. The composition was heated in an oven at 121° C. with occasional agitation. After a translucent, homogeneous solution was formed the jar was cooled and 0.2 grams of Printex 3 carbon black was added and mixed with the composition to a paste like consistency.

A Part B composition was made by combining the following ingredients in a cup and hand mixing with a wooden tongue depressor to a paste-like consistency: 46.9 grams of Epon 828, 7.5 grams of MK107, 6.6 grams of the epoxy resin premix composition described in Examples 52–58, 16.5 grams of Epon™ 58006 resin, 23.1 grams of GP7I silica, 2.0 grams Cab-O-Sil™TS 720 silica, and 0.8 grams of K37 glass bubbles. To this mixture was added 8.5 grams of catechol and uniformly distributed. The cup was then capped and heated in the oven at 125° C. with occasional stirring until the catechol was completely dissolved and the composition was mixed to a uniform consistency. The mixture was allowed to cool to ambient temperature. An epoxy adhesive was prepared by combining 5.7 grams of Part B with 0.5 grams of the Part A in a small ointment can and mixed to a uniform consistency. Sustained load test results are shown in Table 18.

Example 250

Example 250 was prepared as Example 249 except that imidazole was used as the catalyst and the stoichiometry was 0.92. Comparative Examples C22–C26 are commercially available and industry accepted one- or two-part epoxy or acrylate adhesives for bonding automotive applications. Comparative Example C22 is a structural one-part epoxy adhesive manufactured for Chrysler Corporation under the name MSCD 457B by Cemedine, U.S.A. Inc. of Oak Creek, Wis., C23 is a structural one-part epoxy adhesive manufactured for Chrysler Corporation under the name MSCD 457C by PPG Industries of Adrian, Mich., and C24 is a structural one-part epoxy structural adhesive manufactured for General Motors under the name 998-1989 by PPG, C25 is an two-part acrylic structural adhesive manufactured by Lord Corporation of Erie, Pa., under the name Versilock™ 262.

TABLE 18

| Ex | Amine | Cate/amine ratio | Cat Gms | Part A gms | % T | % Cat | SLD cycles |
|---|---|---|---|---|---|---|---|
| 232 | 3-Amino-1-propanol | 60/40 | 33.7 | 0.77 | 3.30 | 4.87 | 45 |
| 233 | 3-Amino-1-propanol | 40/60 | 36.1 | 0.73 | 3.30 | 4.89 | 24 |
| 234 | Ethanolamine | 60/40 | 37 | 0.71 | 3.30 | 4.88 | 40 |
| 235 | Ethanolamine | 40/60 | 41 | 0.65 | 3.30 | 4.90 | 19 |
| 236 | 2-Ethylhexylamine | 60/40 | 20.1 | 0.90 | 2.50 | 3.66 | 15 |
| 237 | 2-Ethylhexylamine | 40/60 | 19.5 | 0.93 | 2.50 | 3.64 | 5 |
| 238 | 2-Ethylhexylamine | 40/60 | 28.7 | 0.95 | 3.50 | 5.10 | 33 |
| 239 | 2-(2-Aminoethoxy)ethanol | 60/40 | 21.5 | 0.84 | 2.50 | 3.67 | 15 |
| 240 | 2-(2-Aminoethoxy)ethanol | 40/60 | 21.7 | 0.84 | 2.50 | 3.67 | 4 |
| 241 | 2-(2-Aminoethoxy)ethanol | 40/60 | 31.9 | 0.87 | 3.50 | 5.13 | 10 |
| 242 | Tridecylamine | 60/40 | 17.8 | 1.01 | 2.50 | 3.61 | 20 |
| 243 | Tridecylamine | 40/60 | 16.2 | 1.12 | 2.50 | 3.60 | 4 |
| 244 | Tridecylamine | 40/60 | 23.8 | 1.14 | 3.50 | 5.03 | 34 |
| 245 | 3-(1-Methylethoxy)-1-propylamine | 60/40 | 20.3 | 0.89 | 2.50 | 3.65 | 6 |
| 246 | 3-(1-Methylethoxy)-1-propylamine | 40/60 | 20.0 | 0.91 | 2.50 | 3.67 | 4 |
| 247 | 3-(1-Methylethoxy)-1-propylamine | 40/60 | 29.3 | 0.73 | 3.50 | 5.11 | 5 |
| 248 | No amine | NA | 0.20 | 0.20 | 3.30 | 4.90 | 43 |
| 249 | No amine | NA | 0.47 | 0.47 | 3.75 | 5.61 | 30+ |
| 250 | 3-Amino-1-propanol | 52/39 | 9.0 | 0.77 | 1.20 | 1.74 | 34 |
| C22 | One-part Epoxy | NA | NA | NA | NA | NA | 5 |
| C23 | One-part Epoxy | NA | NA | NA | NA | NA | 4 |
| C24 | One-part Epoxy | NA | NA | NA | NA | NA | 5 |
| C25 | Two-part Acrylate | NA | NA | NA | NA | NA | 1 |

+Test was interrupted by metal failure of test coupon.

The data in Table 18 shows how the type and amount of amine and catalyst influence the durability of the cured adhesive under Sustained Load cycling conditions. In general, as the amount of amine increases, relative to the amount of catechol, a higher catalyst level may be necessary to achieve extended sustained load durability performance.

The epoxy resin adhesive composition from Example 248 was tested for Sustained Load (SLD Cycles) with the different steel and lube combinations shown in Table 19.

TABLE 19

| Ex | Steel | Lube Type | Coating Weight (g-m$^{-2}$) | SLD cycles |
|---|---|---|---|---|
| 248 | G60HDES | 61 MAL | 2.70 | 35 |
| 248 | G60HDES | Chempet BW | 4.84 | 45+ |
| 248 | A40 Galvannealed* | 61 MAL | 4.31 | 65+ |
| 248 | A40 Galvannealed* | Chempet BW | 4.84 | 65+ |

*Available from National Steel
+Test terminated before failure

The data in Table 19 illustrate how the type of metal, the type of lube and the lube coating weight can influence the sustained load durability.

Examples 251–257

A part B composition was prepared as in Examples 52–58. A number of part A catalyst compositions were prepared by mixing in jars 100 grams of each of a variety of amines with varying amounts of 2-ethyl-4-methylimidazoline catalyst (Catalyst Grams) as Table 20. Only an amine was used as a chain extender in these examples. The amount of Part A shown in Table 20 (Part A—Grams) was mixed with 5.0 grams of the Part B described above. The Amine/Epoxy ratio was maintained at 0.82 and the amount of catalyst (% Cat.) is shown based on weight of reactive species. T-Peel Adhesion results at 23° C. on MEK cleaned and 61MAL lubed steel are shown in Table 20.

TABLE 20

| Ex | Amine | Catalyst Grams | Part A Grams | % Cat | T-Peel N-cm$^{-1}$ MEK | T-Peel N-cm$^{-1}$ 61MAK |
|---|---|---|---|---|---|---|
| 251 | 3-Amino-1-propanol | 40.8 | 0.66 | 5.14 | 137 | 70 |
| 252 | Benzylamine | 29.7 | 0.87 | 5.07 | 145 | 88 |
| 253 | 2-Ethylhexyl-amine | 25.3 | 1.00 | 4.97 | 137 | 61 |
| 254 | Ethanolamine | 49.3 | 0.57 | 5.19 | 128 | 75 |
| 255 | 2-(2-Amino-ethoxy)ethanol | 30.2 | 0.85 | 5.04 | 119 | 123 |
| 256 | Tridecylamine | 17.7 | 1.44 | 4.81 | 102 | 61 |
| 257 | 3-(1-Methyl-ethoxy)-1-propylamine | 26.2 | 0.97 | 5.00 | 131 | 70 |
| C26 | Dodecylamine | 18.7 | 1.35 | 4.82 | R | R |

R = Part A recrystallized - not tested

The data of Table 20 shows that satisfactory results may be obtained with a chain extender containing only an amine. In general, as the amine content of the chain extender increases, the ability of the adhesive composition to bond to lubricated surfaces may decrease.

In the assembly of structures obtaining integrity from the adhesive of the invention, often a structural or frame member is combined with a panel member. Maintaining the frame and panel in a correct alignment or position until the adhesive cures is often a difficult task. Often parts are clamped or spot welded to maintain the location of the parts. These assembly techniques are often not suitable for finished panels requiring smooth uninterrupted surfaces free of dimples or any other surface defects. A self-aligning or positioning feature has been developed that can be introduced into a frame member and into a corresponding panel member that fixes the panel member in place on the frame and maintains its position enabling the adhesive to cure and form a strong structural bond. Such a structure can be seen in the assembly 60 shown in FIG. 6. Frame members 61a and 61b are shown. These members 61a and 61b can be separate, attached to other components or can be a unitary part in a frame assembly 61. A panel 62, having two or more flanges 62a and 62b, is fixed in place on frame members 61a, 61b. When made of metal (e.g., steel), it is desirable for the frame members 61a and 61b to be hydroformed and panel 62 to be stamped using conventional techniques. An adhesive mass 63 is positioned between the panel 62 and each of the frame members 61a and 61b. The adhesive mass 63 can be one of those disclosed herein or any other structural adhesive. The dimensions of the panel and members are fixed such that a portion 66 of the adhesive mass 63 is wicked into the narrow separation between each panel flange 62a and 62b and the corresponding frame members 61a and 61b. The position of the panel 62 with respect to the frame 61 is maintained by positioning means. The positioning means keeps the panel 62 and the frame 61 in position at least long enough for the adhesive mass 63 to set or cure. For the adhesives disclosed herein, curing of this mass 63 may take up to four hours or longer. The positioning means can comprise a pressure or friction fit between the panel flanges 62a and 62b and corresponding frame members 61a and 61b. The positioning means can also comprise one or more or a combination of channels, dimples or other indentations 64 on one or more of the frame members 61a and 61b with one or more or a combination of mating ridges, bumps or other protuberances 65 on the corresponding panel flange 62a and 62b. It is also envisioned that the indentations 64 could be on the panel 62 and the mating protuberances 65 on the frame 61. Alternatively, one or more of the indentations 64 and protuberances 65 could be on both the panel 62 and frame 61. Furthermore, any conventional snap-fit type construction may be suitable for keeping the panel 62 and frame 61 together. A combination of both indentations/protuberances and pressure or friction fitting may also be desirable. Stamping or hydroforming, as applicable, can enable these indentations 64 and protuberances 65 to be formed as the panel 62 and frame 61 are being formed. It is desirable for the dimensions of the frame 61 and the panel 62 to be selected such that the adhesive positions indicated by reference numbers 63 and 66 are dimensioned such that sufficient adhesive can be used to maintain a joint of structural integrity without wasting adhesive. Further, it is desirable for frame 61 and panel 62 to be dimensioned so that the adhesive is rapidly wicked into place in one or, preferably, both of the joint areas indicated by reference numbers 63 and 66. In forming the frame/panel assembly 60, the adhesive can be applied either to the panel 62 or the frame member 61, or to both just prior to assembly. After the adhesive is applied, the panel 62 is simply installed, and the positioning means locates the panel in the correct position without substantial effort. The resiliency of the material (e.g., metal) used to make the panel 62 can be adjusted so as to allow the panel flanges 62a and 62b to flex and the protuberances 65 to snap in place into the corresponding indentations 64 of the frame members 61a and 61b. This self-positioning feature places the panel 62 in the correct alignment and creates the correct geometry for the adhesive bonds 63 and 66. Whether or not there are indentations 64 and protuberances 65 present, the resiliency of the panel material can also be adjusted so as to allow the flanges 62a and 62b to flex and exert pressure against the corresponding frame members 61a and 61b.

Since many embodiments of the invention can be made without departing from the spirit and scope of the invention, the invention resides in the claims hereinafter appended.

We claim:

1. An epoxy composition comprising:
   (a) a chain extender comprising at least one of an amine and a phenolic compound, the amine being at least one of a primary mono-amine, a secondary di-amine and other amines having two reactive hydrogens per molecule;
   (b) a base catalyst;
   (c) a reactive epoxy resin that has not been substantially chain extended; and
   (d) a polymeric toughener,
   wherein the chain extender, the reactive epoxy resin, the catalyst and the toughener are each in an amount and of a type that, when mixed together, form a thermally curable composition, the composition comprises a part A and a part B, with the part A comprising the catalyst and the part B comprising the reactive epoxy resin, the composition is substantially free of a polyfunctional curing agent and exhibits a stoichiometric equivalents ratio of reactive hydrogen sites to reactive epoxy sites that is less than 1.0, the epoxy and chain extender are substantially unreacted when the composition is exposed to the catalyst and, during the curing of the composition, at least about 50% by weight of the epoxy resin is chain extended and the chain extended epoxy resin is cross-linked.

2. The composition of claim 1, wherein the composition is in the form of a liquid or paste.

3. The composition of claim 1, wherein the chain extender comprises at least one of an amine and a phenolic compound in monomeric form.

4. The composition of claim 1, wherein the chain extender comprises at least the phenolic compound and the phenolic compound is a dihydric phenolic compound.

5. The composition of claim 1, wherein the chain extender comprises at least one of an catechol, resorcinol and amine compound, and the chain extender is dissolvable into at least one of the epoxy resin and the catalyst.

6. The composition of claim 1, wherein the chain extender comprises at least one of an amine and a dihydroxy phenolic, the composition is an adhesive composition comprising the part A and the part B, and if the chain extender includes an amine, the amine is only in the part A.

7. The composition of claim 1, wherein the composition is an adhesive composition comprising the part A and the part B, and at least one of part A and part B further comprises the chain extender.

8. The composition of claim 1, wherein the chain extender is at least one of an amine, catechol and resorcinol compound, the composition is an adhesive composition comprising the part A and the part B, and at least one of part A and part B further comprises the chain extender, with the amine only being in the part A.

9. The composition of claim 1, wherein the chain extender comprises a catechol, the composition is an adhesive composition comprising the part A and the part B, and at least the part B further comprises the catechol.

10. The composition of claim 1, wherein the chain extender comprises catechol and resorcinol, the composition is an adhesive composition comprising the part A and the part B, at least the part A further comprises the resorcinol, and at least the part B further comprises the catechol.

11. The composition of claim 1, wherein at least about 50 wt % of the chain extender is catechol.

12. The composition of claim 11, wherein the chain extender comprises catechol and resorcinol, and up to about 50 wt % of the chain extender is resorcinol.

13. The composition of claim 12, wherein the amount of chain extender in the composition is in the range of from about 8 wt % to about 30 wt %, based on the amount of chain extender and reactive epoxy.

14. The composition of claim 1, wherein the catalyst comprises at least one catalyst selected from the group consisting of a cyclic amidine, a tertiary amine, substituted analogues thereof, and a substituted analogue of pyridine, of pyrrolidine and of piperidine which do not exhibit enough of an electron withdrawing or stereo chemical effect to prevent the composition, when mixed together, from forming a thermally curable adhesive suitable for structural bonding.

15. The composition of claim 1, wherein the catalyst comprises a first catalyst and a second catalyst different than the first.

16. The composition of claim 15, wherein the first catalyst comprises an imidazoline catalyst and the second catalyst comprises an imidazole catalyst.

17. The composition of claim 1, wherein the catalyst comprises at least one of imidazole, imidazoline, a substituted imidazole compound, a substituted imidazoline compound, 1,4,5,6-tetrahydropyrimidine and a substituted 1,4,5,6-tetrahydropyrimidine compound.

18. The composition of claim 1, wherein the composition is an adhesive composition, the catalyst comprises an imidazoline compound, and the chain extender comprises catechol.

19. The composition of claim 1, wherein the reactive epoxy resin comprises a glycidyl ether epoxy compound having more than one reactive epoxy group.

20. The composition of claim 1, wherein the reactive epoxy resin comprises at least one of an aromatic glycidyl ether epoxy compound and an aliphatic glycidyl ether epoxy compound.

21. The composition of claim 1 containing an amount of the catalyst in the range of from about 0.5 wt % to about 10.0 wt %, based on the reactive species in the composition, an amount of the reactive epoxy resin in the range of from about 50 wt-% to about 90 wt-% of the adhesive, based on the reactive species in the composition, and an amount of the polymeric toughener in the range of from about 5 parts to about 35 parts by weight, based on 100 parts by weight of the reactive epoxy resin.

22. The composition of claim 1, the components of the composition are present in amounts such that the stoichiometric equivalents ratio of reactive hydrogen sites to reactive epoxy sites is in the range of about 0.5 to less than about 1.0.

23. The composition of claim 1, wherein the components of the composition are present in amounts such that the stoichiometric equivalents ratio of reactive hydrogen sites to reactive epoxy sites is in the range of about 0.7 to less than about 1.0.

24. The composition of claim 1, wherein the composition is an adhesive that can form an adhesive bond having an impact peel strength of at least 3 J at a temperature in the range of from about −40° C. to about +90° C.

25. The composition of claim 1, wherein the composition is an adhesive capable of forming an adhesive bond having a T-peel strength of greater than about 85 N/cm at 23° C.

26. The composition of claim 1, wherein the composition is an adhesive composition.

27. The composition of claim 1, wherein the catalyst includes at least one from the group consisting of:
   a) 2-ethyl-4-methylimidazoline in the range of from about 1.0 wt-% to about 8.0 wt-%;
   b) 2-benzyl-2-imidazoline in the range of from about 3.0 wt-% to about 11.0 wt-%;
   c) 4,4'-dimethyl-2-imidazoline in the range of from about 3.0 wt-% to about 7.0 wt-%;
   d) an imidazole in the range of from about 0.25 wt-% to about 3.0 wt-%;
   e) DBUE in the range of from about 4.0 wt-% to about 8.0 wt-%;
   f) 1-butylpyrrolidine in the range of from about 3.0 wt-% to about 7.0 wt-%;
   g) 1,4,5,6-tetrahydropyrimidine in the range of from about 3.0 wt % to about 8.5 wt %;
   h) 1,2-dimethyl-1,4,5,6-tetrahydropyrimidine in the range of from about 1.5 wt-% to about 6.0 wt-%; and
   i) N,N-dimethylbenzylamine in the range of from about 4.0 wt-% to about 8.0 wt-%, with each wt-% being based on the weight of epoxy, chain extender and catalyst.

28. The composition of claim 1, wherein the catalyst includes at least one from the group consisting of:
   a) 2-ethyl-4-methylimidazoline in the range of from about 2 wt-% to about 7.0 wt-%;
   b) 2-benzyl-2-imidazoline in the range of from about 4.0 wt-% to about 10.0 wt-%;
   c) 4,4'-dimethyl-2-imidazoline in the range of from about 4.0 wt-% to about 6.0 wt-%;
   d) an imidazole in the range of from about 0.5 wt-% to about 2.25 wt-%;
   e) DBUE in the range of from about 5.0 wt-% to about 7.0 wt-%;
   f) 1-butylpyrrolidine in the range of from about 3.0 wt-% to about 7.0 wt-%;
   g) 1,4,5,6-tetrahydropyrimidine in the range of from about 3.0 wt % to about 8.5 wt %;
   h) 1,2-dimethyl-1,4,5,6-tetrahydropyrimidine in the range of from about 1.5 wt-% to about 6.0 wt-%; and
   i) N,N-dimethylbenzylamine in the range of from about 4.0 wt-% to about 8.0 wt-%, with each wt-% being based on the weight of epoxy, chain extender and catalyst.

29. An epoxy composition comprising:
   (a) a chain extender that includes catechol and that is at least substantially in monomeric form;
   (b) a base catalyst;
   (c) a reactive epoxy resin that has not been substantially chain extended; and
   (d) a polymeric toughener,
   wherein the chain extender, the reactive epoxy resin, the catalyst and the toughener are each in an amount and of a type that, when mixed together, form a thermally curable composition, the composition comprises a part A and a part B, with the part A comprising the catalyst and the part B comprising the reactive epoxy resin, the composition is substantially free of a polyfunctional curing agent and exhibits a stoichiometric equivalents ratio of reactive hydrogen sites to reactive epoxy sites that is less than 1.0 so as to provide excess epoxy for cross-linking, the epoxy and chain extender are substantially unreacted when the composition is exposed to the catalyst, and during the curing of the composition, at least about 50% by weight of the epoxy resin is chain extended.

30. The composition of claim 1, wherein the composition is an adhesive composition comprising the part A and the part B, the part B comprises the reactive epoxy resin and the chain extender.

31. The composition of claim 29, wherein the composition is an adhesive composition comprising the part A and the part B, the part B comprises the reactive epoxy resin and the catechol chain extender.

32. The composition of claim 29, wherein the composition is in the form of a liquid or paste.

* * * * *

UNITED STATES PATENT AND TRADEMARK OFFICE
CERTIFICATE OF CORRECTION

PATENT NO. : 6,486,256 B1  
DATED : November 26, 2002  
INVENTOR(S) : Tarbutton, Kent S.

It is certified that error appears in the above-identified patent and that said Letters Patent is hereby corrected as shown below:

Column 2,  
Line 59, insert -- . -- following "thereof".  
Line 64, insert -- . -- following "thereof".

Column 8,  
Line 36, insert -- . -- following "thereof".

Column 21,  
Under table, delete "the", insert in place thereof -- The --;

Column 29,  
Line 30, delete "2-ethyl", insert in place thereof -- 2-ethyl-4-methyl --.

Signed and Sealed this

Thirteenth Day of April, 2004

JON W. DUDAS  
*Acting Director of the United States Patent and Trademark Office*